United States Patent
Shiota et al.

(10) Patent No.: US 7,349,003 B2
(45) Date of Patent: Mar. 25, 2008

(54) METHOD FOR DETERMINING A CORRECTION VALUE FOR LIGHT-EMITTING PARTS IN EXPOSURE APPARATUS

(75) Inventors: Akira Shiota, Saitama (JP); Makoto Yasunaga, Kawagoe (JP); Sadao Masubuchi, Chofu (JP); Akinobu Iwako, Iruma (JP); Masafumi Yokoyama, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 247 days.

(21) Appl. No.: 10/498,061

(22) PCT Filed: Oct. 10, 2003

(86) PCT No.: PCT/JP03/13087

§ 371 (c)(1),
(2), (4) Date: Jun. 9, 2004

(87) PCT Pub. No.: WO2004/033216

PCT Pub. Date: Apr. 22, 2004

(65) Prior Publication Data
US 2005/0068590 A1    Mar. 31, 2005

(30) Foreign Application Priority Data

| Oct. 10, 2002 | (JP) | 2002-297721 |
| Oct. 10, 2002 | (JP) | 2002-297797 |
| Oct. 10, 2002 | (JP) | 2002-297814 |
| Oct. 10, 2002 | (JP) | 2002-297836 |

(51) Int. Cl.
*B41J 2/435* (2006.01)
*B41J 15/14* (2006.01)

(52) U.S. Cl. ................. 347/236; 347/241

(58) Field of Classification Search ........ 347/236, 347/241; 355/77; 250/584, 586; 396/564
See application file for complete search history.

(56) References Cited

U.S. PATENT DOCUMENTS 6,034,710 A * 3/2000 Kawabe et al. ............ 347/236

(Continued)

FOREIGN PATENT DOCUMENTS

JP    2001-138568    5/2001

(Continued)

*Primary Examiner*—Stephen Meier
*Assistant Examiner*—Carlos A. Martinez, Jr.
(74) *Attorney, Agent, or Firm*—Finnegan, Henderson, Farabow, Garrett & Dunner, L.L.P.

(57) ABSTRACT

The invention is directed to the provision of an exposure apparatus that can determine a correction value for each individual light-emitting part by employing a method that detects the amount of light corresponding to one particular light-emitting part from composite light containing light rays from adjacent light-emitting parts, and also to the provision of a method for producing such an exposure apparatus. The production method according to the invention comprises the steps of lighting a plurality of light-emitting parts at the same time, detecting an output light-amount distribution across all of the plurality of light-emitting parts by making measurements using a line-like light-receiving device, detecting a peak position corresponding to each light-emitting part by using the output light-amount distribution; detecting the amount of light of each light-emitting part based on the peak position, and determining, based on the amount of light of each light-emitting part, the correction value for correcting nonuniformity in the amount of light of the light-emitting part.

9 Claims, 31 Drawing Sheets

U.S. PATENT DOCUMENTS

| | | | |
|---|---|---|---|
| 6,278,474 B1* | 8/2001 | Wada et al. | 347/241 |
| 6,373,074 B1* | 4/2002 | Mueller et al. | 250/584 |
| 2001/0040676 A1* | 11/2001 | Hirata et al. | 355/77 |
| 2002/0056817 A1* | 5/2002 | Furue | 250/584 |
| 2002/0100885 A1* | 8/2002 | Isoda et al. | 250/586 |
| 2002/0127017 A1* | 9/2002 | Shimamura | 396/564 |

FOREIGN PATENT DOCUMENTS

JP    2001-267636    9/2001

* cited by examiner

Fig.22

| DRIVING PIXEL N \ DRIVING GRAYSCALE H | 0 | 1 | 2 | . | . | . | 123 Fmin | 124 | 125 | . | . | . | 477 | 478 | 479 |
|---|---|---|---|---|---|---|---|---|---|---|---|---|---|---|---|
| 0 | 0 | 0 | 0 | . | . | . | 0 | 0 | 0 | . | . | . | 0 | 0 | 0 |
| 1 | 0 | 0 | 0 | . | . | . | 1 | 0 | 1 | . | . | . | 1 | 0 | 1 |
| 2 | 1 | 1 | 1 | . | . | . | 2 | 1 | 2 | . | . | . | 2 | 1 | 2 |
| . | . | . | . | . | . | . | . | . | . | . | . | . | . | . | . |
| . | . | . | . | . | . | . | . | . | . | . | . | . | . | . | . |
| . | . | . | . | . | . | . | . | . | . | . | . | . | . | . | . |
| 127 | 124 | 124 | 125 | . | . | . | 127 | 124 | 125 | . | . | . | 126 | 124 | 125 |
| 128 | 125 | 125 | 126 | . | . | . | 128 | 125 | 126 | . | . | . | 127 | 125 | 126 |
| 129 | 126 | 126 | 127 | . | . | . | 129 | 126 | 127 | . | . | . | 128 | 126 | 127 |
| . | . | . | . | . | . | . | . | . | . | . | . | . | . | . | . |
| . | . | . | . | . | . | . | . | . | . | . | . | . | . | . | . |
| . | . | . | . | . | . | . | . | . | . | . | . | . | . | . | . |
| 253 | 246 | 246 | 248 | . | . | . | 253 | 246 | 249 | . | . | . | 251 | 246 | 249 |
| 254 | 248 | 248 | 250 | . | . | . | 254 | 248 | 251 | . | . | . | 253 | 248 | 251 |
| 255 | 250 | 250 | 252 | . | . | . | 255 | 250 | 253 | . | . | . | 254 | 250 | 253 |

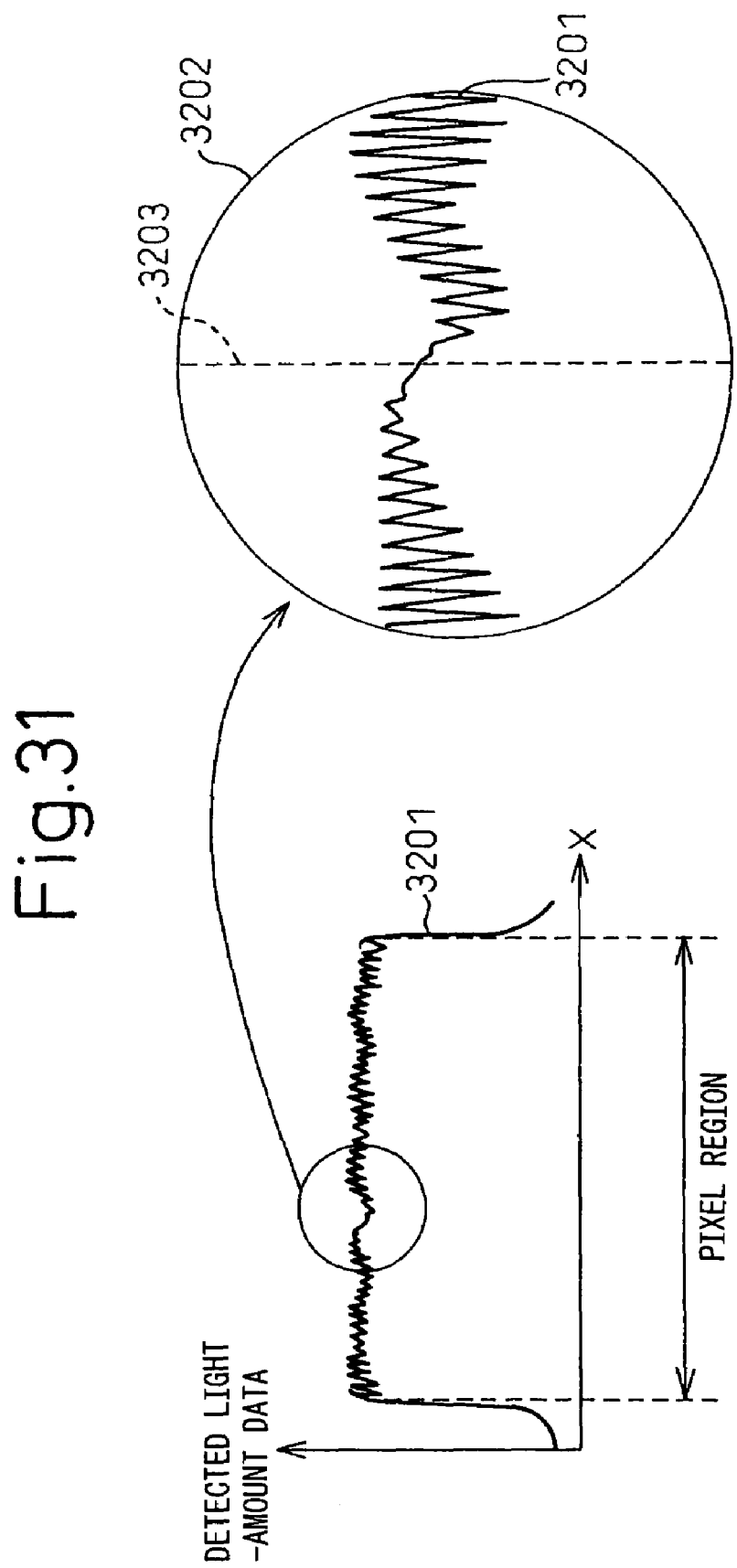

METHOD FOR DETERMINING A CORRECTION VALUE FOR LIGHT-EMITTING PARTS IN EXPOSURE APPARATUS

BACKGROUND ART

The present invention relates to an exposure apparatus in which correction values are prestored, for correcting variations in the amount of light among a plurality of pixels contained in a light modulating device, and a method for producing such an exposure apparatus.

DESCRIPTION OF THE PRIOR ART

It is known to provide an optical printer which forms a color image by exposing a color photosensitive material or the like to light by using an exposure head equipped with a plurality of light-emitting parts. As such an exposure head has a plurality of light-emitting parts, there has been the problem that variations occur in the amount of light among the plurality of light-emitting parts, resulting in an inability of obtain an image of good quality. To address this problem, it has been practiced to apply shading correction (light-amount correction) by detecting the variations among the light-emitting parts.

In a first prior art method of shading correction, the amount of light emitted from each light-emitting part is measured with a light sensor by lighting the plurality of light-emitting parts one at a time.

This method, however, has had the deficiency that a correct shading correction cannot be accomplished because environmental conditions of the light-emitting parts and the light sensor vary during the measurement. Another deficiency has been that it takes time to complete the measurement because the measurement is made on one light-emitting part at a time. Furthermore, when the exposure head constructed from the plurality of light-emitting parts is actually operated for exposure, light rays from two or more light-emitting parts (for example, a plurality of adjacent light-emitting parts) are incident in overlapping fashion on any particular point on the photosensitive material due to the spreading of light emitted from each light-emitting part and due to such errors as the tilting of a lens system (SELFOC lens array, etc.) provided between the light-emitting parts and the photosensitive material. Accordingly, when exposure is performed on the photosensitive material by using the exposure head which has been corrected for variations in the amount of light among the light-emitting parts by measuring the amount of light emitted from one particular light-emitting part, unevenness occurs in the amount of exposure of the photosensitive material because of the light spilling over from adjacent light-emitting parts, resulting in unevenness in color image density. That is, the above method has had the further deficiency of being unable to make a correction for the effects from the adjacent light-emitting parts.

In a second prior art method of shading correction, a trial exposure is performed on a photosensitive material by lighting all of the plurality of light-emitting parts at the same time, after which the photosensitive material is developed and color densities measured, and the variation in the amount of light of each light-emitting part is corrected based on the measured values of the color densities (Japanese Unexamined Patent Publication No. H09-127485, pp. 7-8 and FIG. 5(A)).

This method, however, has had the deficiencies that it takes time and labor to develop the photosensitive material, and that the variation in the amount of light of each light-emitting part cannot be corrected quickly and in a simple manner.

In a third prior art method of shading correction, the effects of light from adjacent light-emitting parts are considered when correcting the variation in the amount of light of each light-emitting part in an exposure head having a plurality of light-emitting parts (Japanese Patent No. 3269425). In this method, it is assumed that one light-emitting part corresponds to one particular region on the light receiving surface, and the correction value for correcting the variation in the amount of light emitted from one light-emitting part is determined based on the amount of light received on that one region. It is assumed here that the amount of light received on the one region is affected by the light from three light-emitting parts, that is, the amount of light (Li, i) from the one light-emitting part corresponding to that one region and the amounts of light (Li−1, i) and (Li+1, i) from its left and right adjacent light-emitting parts.

In this method, however, as the amount of light received on the one region includes the amounts of light (Li−1, i) and (Li+1, i) from the left and right adjacent light-emitting parts as just described, there has been the problem that, if the one light-emitting part corresponding to the one region is controlled, the unevenness in the amount of light falling on the photosensitive material cannot be corrected, resulting in unevenness in image density. There has also been the problem that it takes time to complete the measurement, because the measurement cannot be performed by lighting all of the plurality of light-emitting parts at the same time.

SUMMARY OF THE INVENTION

With the first prior art method described above, it has basically not been possible to make a correct correction. With the second prior art method described above, while the correction can be made for the effects of adjacent light at the same time, there has been the problem that the correction takes too much time and labor since it takes the steps of exposure, development, and measurement. Further, the third prior art method described above aims at correcting for the effects of adjacent light, but the method itself is wrong and a correct correction cannot be made.

Accordingly, it is an object of the present invention to provide an exposure apparatus that can determine a correction value for each individual light-emitting part by employing a method that detects the amount of light corresponding to one particular light-emitting part from composite light containing light rays from adjacent light-emitting parts, and a production method for producing such an exposure apparatus.

It is another object of the present invention to provide an exposure apparatus that can determine a correction value for each individual light-emitting part by measuring the amount of light of each of the plurality of light-emitting parts in the exposure head under the same conditions without causing changes in the environmental conditions of the light-emitting parts and the light sensor, and a production method for producing such an exposure apparatus.

It is a further object of the present invention to provide an exposure apparatus that can correct the amount of light of each of the plurality of light-emitting parts in the exposure head in such a manner as not to cause nonuniformity in exposure due to light from adjacent light-emitting parts, and a production method for producing such an exposure apparatus.

To achieve the above objects, there is provided, according to the present invention, a production method comprising the steps of lighting the plurality of light-emitting parts at the same time, detecting an output light-amount distribution across all of the plurality of light-emitting parts by making measurements using a line-like light-receiving device, detecting a peak position corresponding to each of the light-emitting parts by using the output light-amount distribution, detecting the amount of light of each light-emitting part based on the peak position, and determining, based on the amount of light of each light-emitting part, a correction value for correcting nonuniformity in the amount of light of the light-emitting part. As the correction value for each individual light-emitting part can be determined by employing the method that detects the amount of light corresponding to one particular light-emitting part from composite light containing light rays from adjacent light-emitting parts, a correct shading correction can be accomplished.

Preferably, in the production method according to the present invention, the step of determining the amount of light of each light-emitting part includes the steps of obtaining a value corresponding to each peak position in the output light-amount distribution, and determining the value as the amount of light of the light-emitting part.

Further preferably, in the production method according to the present invention, the step of determining the amount of light of each light-emitting part includes the steps of providing a reference light-amount distribution, obtaining a sole light-amount distribution for the light-emitting part corresponding to the peak position, by using the reference light-amount distribution and the output light-amount distribution near the peak position, and determining the amount of light of the light-emitting part based on the sole light-amount distribution.

Preferably, in the production method according to the present invention, the light-emitting parts each have an opening tilted at a prescribed angle in a direction in which the light-emitting parts are arranged.

Preferably, in the production method according to the present invention, the step of lighting the plurality of light-emitting parts at the same time includes the steps of lighting all of odd-numbered ones of the plurality of light-emitting parts at the same time, and lighting all of even-numbered ones of the plurality of light-emitting parts at the same time.

Preferably, in the production method according to the present invention, the step of detecting the output light-amount distribution includes the steps of detecting a first output light-amount distribution occurring when all of the odd-numbered ones of the plurality of light-emitting parts are lighted at the same time, and detecting a second output light-amount distribution occurring when all of the even-numbered ones of the plurality of light-emitting parts are lighted at the same time.

Preferably, in the production method according to the present invention, the step of detecting the peak position includes the steps of detecting a first peak position by using the first output light-amount distribution, detecting a second peak position by using the second output light-amount distribution, and combining the first peak position and the second peak position.

Preferably, in the production method according to the present invention, the control means has a memory, and is configured to control the exposure head based on data stored in the memory, wherein the method further includes the step of storing the thus determined correction value in the memory.

Preferably, in the production method according to the present invention, the light-receiving device includes light-receiving parts, each having a width narrower than the width of each of the light-emitting parts.

Preferably, in the production method according to the present invention, the number of light-receiving parts contained in the light-receiving device is equal to an integral multiple of the number of the plurality of light-emitting parts.

Preferably, in the production method according to the present invention, the light-receiving parts are arranged in such a manner that three or more light-receiving parts correspond to one light-emitting part.

Preferably, in the production method according to the present invention, a light-receiving surface formed by the plurality of light-receiving parts is longer than a light-emitting surface formed by the plurality of light-emitting parts.

Further, to achieve the above objects, there is provided, according to the present invention, an exposure apparatus comprising an exposure head having a plurality of light-emitting parts whose amounts of light each vary with a supplied driving signal, and a control means for generating the driving signal by correcting image data in accordance with a correction value stored in a memory, wherein the correction value is preferably determined based on the steps of lighting the plurality of light-emitting parts at the same time, detecting an output light-amount distribution across all of the plurality of light-emitting parts by making measurements using a line-like light-receiving device, detecting a peak position corresponding to each of the light-emitting parts by using the output light-amount distribution, detecting the light of light of each light-emitting part based on the peak position, and determining, based on the amount of light of each light-emitting part, the correction value for correcting nonuniformity in the amount of light of the light-emitting part.

To achieve the above objects, there is also provided, according to the present invention, a production method comprising the steps of lighting the plurality of light-emitting parts at the same time, measuring amounts of light from the plurality of light-emitting parts by using a light-receiving device, detecting a peak value and a peak position from measured values obtained by the light-receiving device, and determining, based on the peak value and the peak position, a correction value for correcting nonuniformity in the amount of light emitted from each light-emitting part.

BRIEF DESCRIPTION OF THE DRAWINGS

FIG. 22 is a diagram showing, by way of example, correction values obtained in accordance with the flow of FIG. 16.

FIG. 31 is a diagram for explaining the characteristic of light-amount data detected when the liquid crystal shutter array having openings of a parallelogrammic shape is used.

DETAILED DESCRIPTION OF THE INVENTION

A first embodiment according to the present invention will be described below with reference to drawings.

Figure 1:
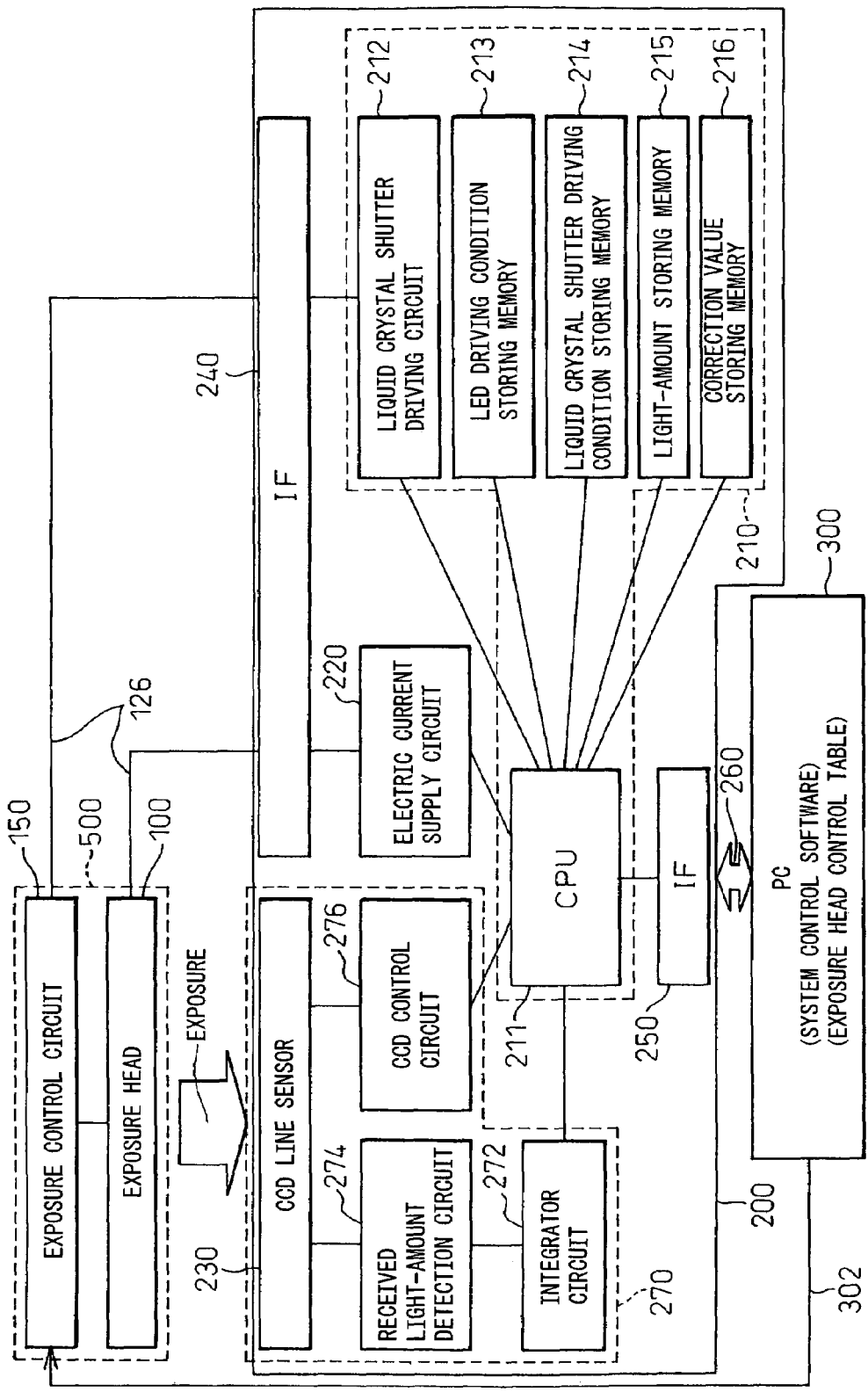
FIG. 1 is a conceptual diagram showing one example of a system according to the present invention.
Figure 2:
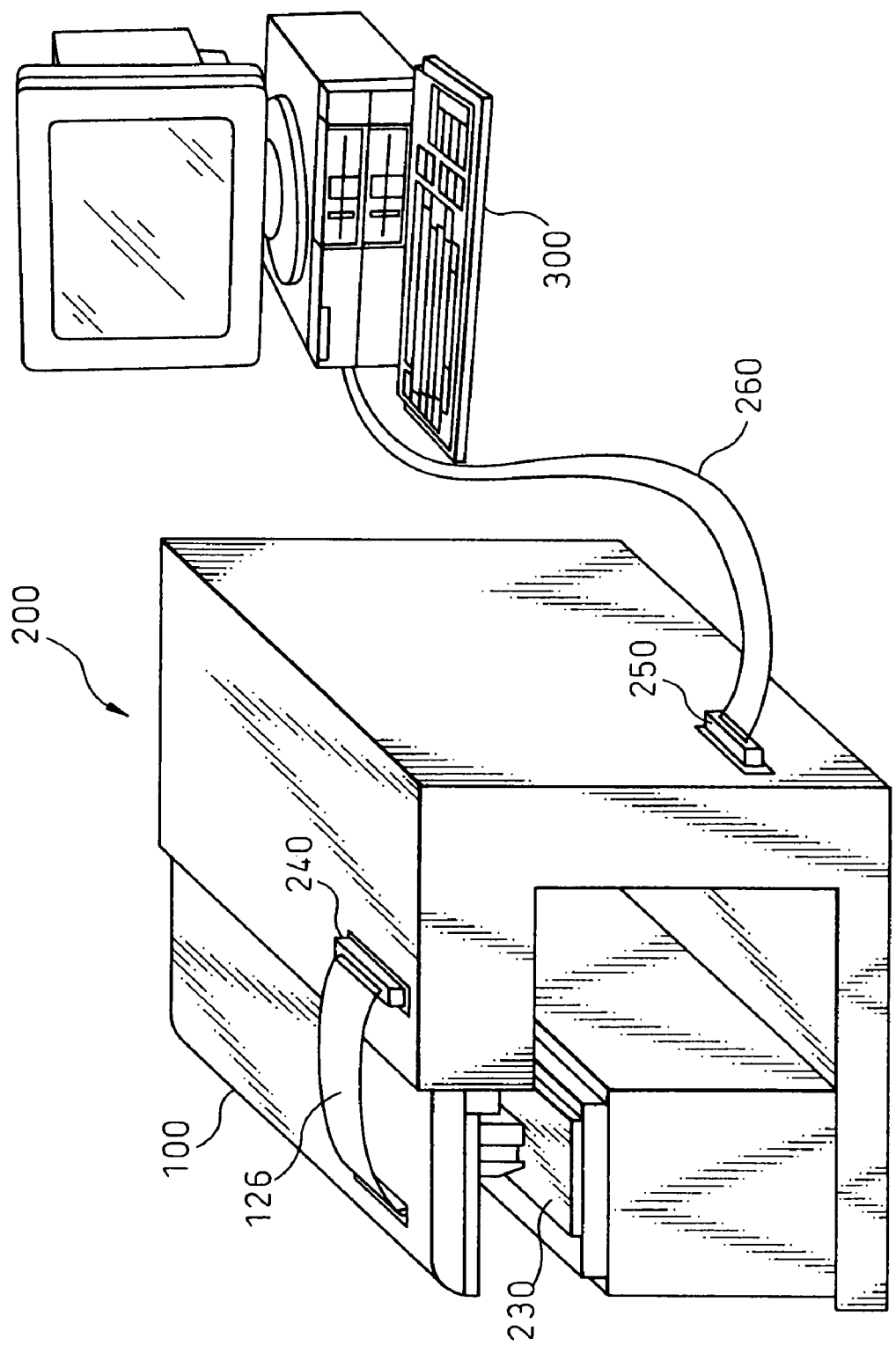
FIG. 2 is a diagram showing an external view of the one example of the system according to the present invention.

FIG. 1 is a diagram showing an overview of a production system, and FIG. 2 is a diagram for explaining an external view of the system.

As shown in FIGS. 1 and 2, the production system comprises an exposure head 100 to be measured, a measuring apparatus 200, and a personal computer (hereinafter referred to as the PC) 300 for performing control.

The exposure head 100 is mounted on the measuring apparatus 200 using an attachment not shown, and a signal line 126 is connected to an interface (hereinafter referred to as the IF) 240 of the measuring apparatus 200. The measuring apparatus 200 and the PC 300 are interconnected by a bus line 260 so that data can be transferred between them. Further, the exposure head 100 is connected to an exposure control circuit 150, which together constitute an exposure apparatus 500.

As shown in FIG. 1, the measuring apparatus 200 includes a driving condition signal creating means 210, an electric current supply circuit 220, the IF 240 for connecting with the exposure head 100, an IF 250 for connecting with the PC 300, and a light-amount measuring means 270.

The driving condition signal creating means 210 includes a CPU 211 for controlling the entire operation, a liquid crystal shutter driving circuit 212, an LED driving condition storing memory 213 for storing control condition data for LEDs contained in the exposure head 100, a liquid crystal shutter driving condition storing memory 214 for storing driving condition data (such as driving grayscale data for each driving pixel) for the measurement of a liquid crystal shutter array 118 (described later) contained in the exposure head 100, a light-amount storing memory 215 for storing the illuminance F(N) (described later) of each driving pixel of the liquid crystal shutter array 118, and a correction value storing memory 216 for correcting the variation in the amount of light of each of the driving pixels in the liquid crystal shutter array 118.

The CPU 211 is connected via the IF 250 and the bus line 260 to the PC 300, and receives control data from the PC 300 about the measurement start timing, measurement end timing, driving conditions for the exposure head 100, etc. The CPU 211 controls the light-amount measurement (production/setting of the exposure apparatus) by controlling the exposure head 100, the measuring apparatus 200, etc. in accordance with the received control data.

The liquid crystal shutter driving circuit 212 controls, via the IF 240 and the line 126, the driving of the plurality of driving pixels of the liquid crystal shutter array 118 contained in the exposure head 100.

The electric current supply circuit 220 supplies electric current via the IF 240 and the line 126 to the LEDs 120 (blue LED, green LED, and red LED) (described later) contained in the exposure head 100; the intensity of light emission of each LED can be controlled by varying the value of the electric current supplied.

The light-amount measuring means 270 includes a CCD line sensor 230, a CCD control circuit 276 for controlling the plurality of light-receiving elements contained in the CCD line sensor 230, a received light amount detecting circuit 274 for detecting the amount of light received by each individual one of the plurality of light-receiving elements contained in the CCD line sensor 230, and an integrator circuit 272 for obtaining received light-amount data per unit time by integrating the detection output of the received light amount detecting circuit 274.

The electric current supply circuit 220 and the liquid crystal shutter driving circuit 212 transmit an LED driving signal and a liquid crystal shutter driving signal via the IF 240 to drive the LEDs 120 and the liquid crystal shutter array 118, respectively.

The measuring apparatus 200 further includes a ROM for storing control programs of the CPU 211, a RAM for temporarily storing various kinds of data, and various kinds of signal lines and bus lines for transferring data between the constituent elements.

The measuring apparatus 200 and the PC 300 obtain the LED driving condition data for the LEDS 120 and the shading correction value data for the liquid crystal shutter array 118 in accordance with the measuring procedures described later, and temporarily store the data in the LED driving condition storing memory 213 and the correction value storing memory 216, respectively. The PC 300 transmits (as indicated by 302) the LED driving condition data and the shading correction value data for the liquid crystal shutter array 118 to the exposure control circuit 150 in the exposure apparatus 500, and stores the data in an LED driving condition storing memory 160 (described later) and a correction value storing memory 153 (described later), respectively, contained in the exposure control circuit 150; the exposure apparatus 500 capable of performing proper LED driving and shading correction is thus produced.

Here, the LED driving condition data and the shading correction value data, measured by the measuring apparatus 200, may be stored in the exposure control circuit 150 as the measurements are made, as previously described. In that case, the LED driving condition storing memory 213 and the correction value storing memory 216 in the measuring apparatus 200 can be omitted.

Alternatively, the following procedure may be employed: (1) a plurality of exposure heads are measured successively by also using the measuring apparatus 200, (2) LED driving condition data (electric current value data) and shading correction data for the plurality of exposure heads 100 are temporarily stored in the PC 300, (3) the data are transferred or moved (via a medium such as an FD or a CD) to another PC, (4) the exposure heads are connected to the respective exposure control circuits, and (5) using that other PC, the data are recorded successively in the respective exposure control circuits. In that case, it is preferable to identify each exposure head by using a serial number printed on a serial number sheet 132 described later.

Figure 3:
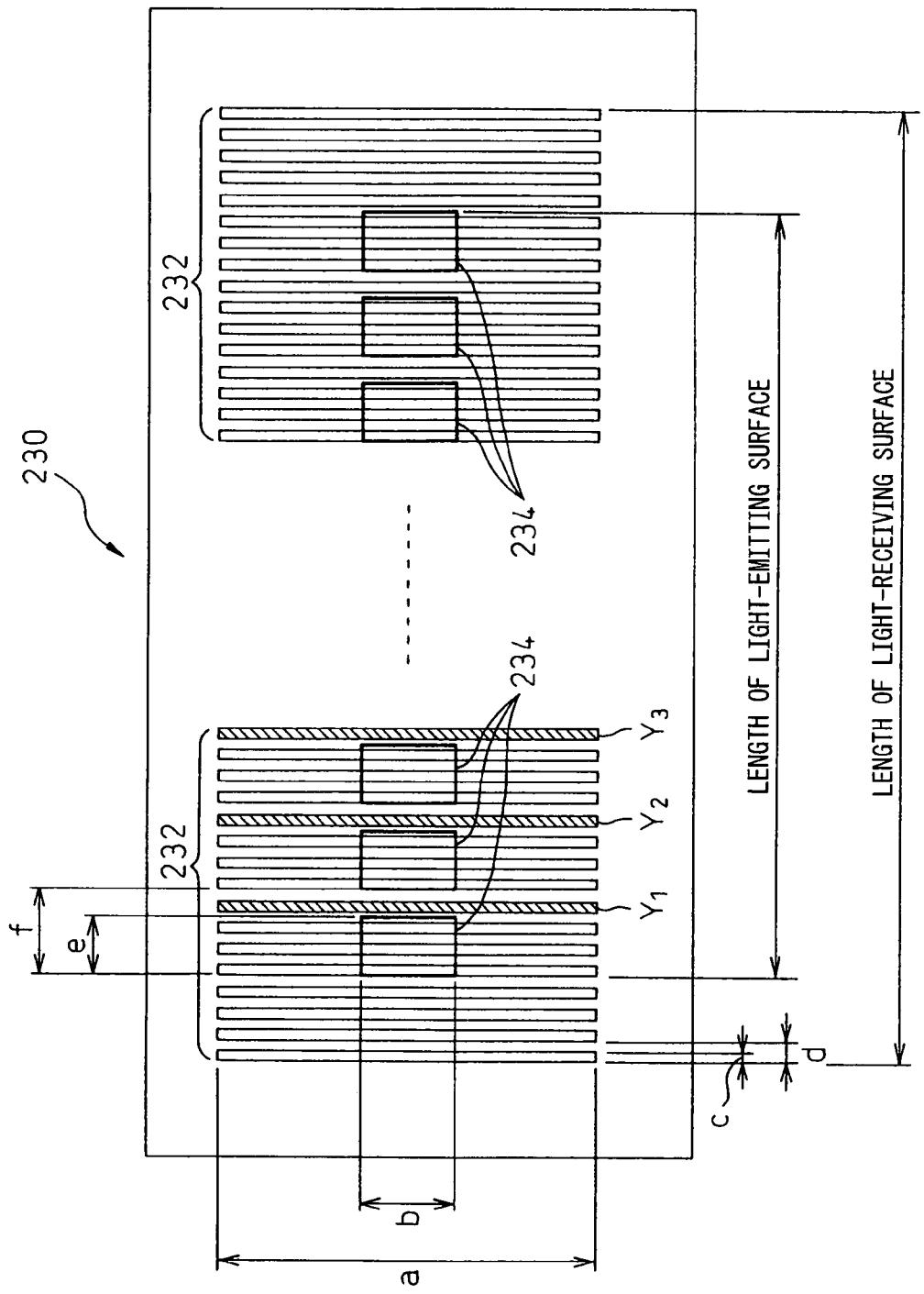
FIG. 3 is a diagram for explaining a CCD line sensor used in the system according to the present invention.

FIG. 3 shows a schematic diagram of the CCD line sensor 230. The CCD line sensor 230 has 2048 vertically long light-receiving elements 232, each having a length "a" of 2500 μm and a width "c" of 25 μm, arranged at a pitch "d" (25 μm). Therefore, in actuality, the light-receiving elements are very closely spaced together, leaving almost no gap between them, but in FIG. 3, a gap is shown between each light-receiving element for convenience of explanation.

In FIG. 3 are also shown the driving pixels 234 of the liquid crystal shutter array 118 described later; the driving pixels 234 each have a length "b" of 150 μm (or 200 μm) and a width "e" of 76 μm, and are arranged at a pitch "f" (100 μm). Accordingly, the driving pixels 234 are arranged so that four light-receiving elements 232 correspond to one driving pixel. In the present embodiment, the liquid crystal shutter array 118 has a total of 480 driving pixels, and the driving pixels 234 are arranged in a straight line as shown in FIG. 3. However, the driving pixels may be arranged in a staggered pattern, for example, to match the wiring layout of electrodes for driving the driving pixels.

Further, as shown in FIG. 3, the overall length of the light receiving surface made up of the light-receiving elements is chosen to be longer than the overall length of the light emitting surface made up of the driving pixels.

In the present embodiment, the driving pixels 234 are arranged so that four light-receiving elements 232 correspond to one driving pixel, but the arrangement is not limited to this particular example. For example, it is preferable that the number of light-receiving elements is equal to an integral multiple of the number of driving pixels, and the arrangement may be made so that three, five, or seven light-receiving elements correspond to one driving pixel. In particular, it is preferable to arrange the driving pixels so that three or more light-receiving elements correspond to one driving pixel.

Figure 4:
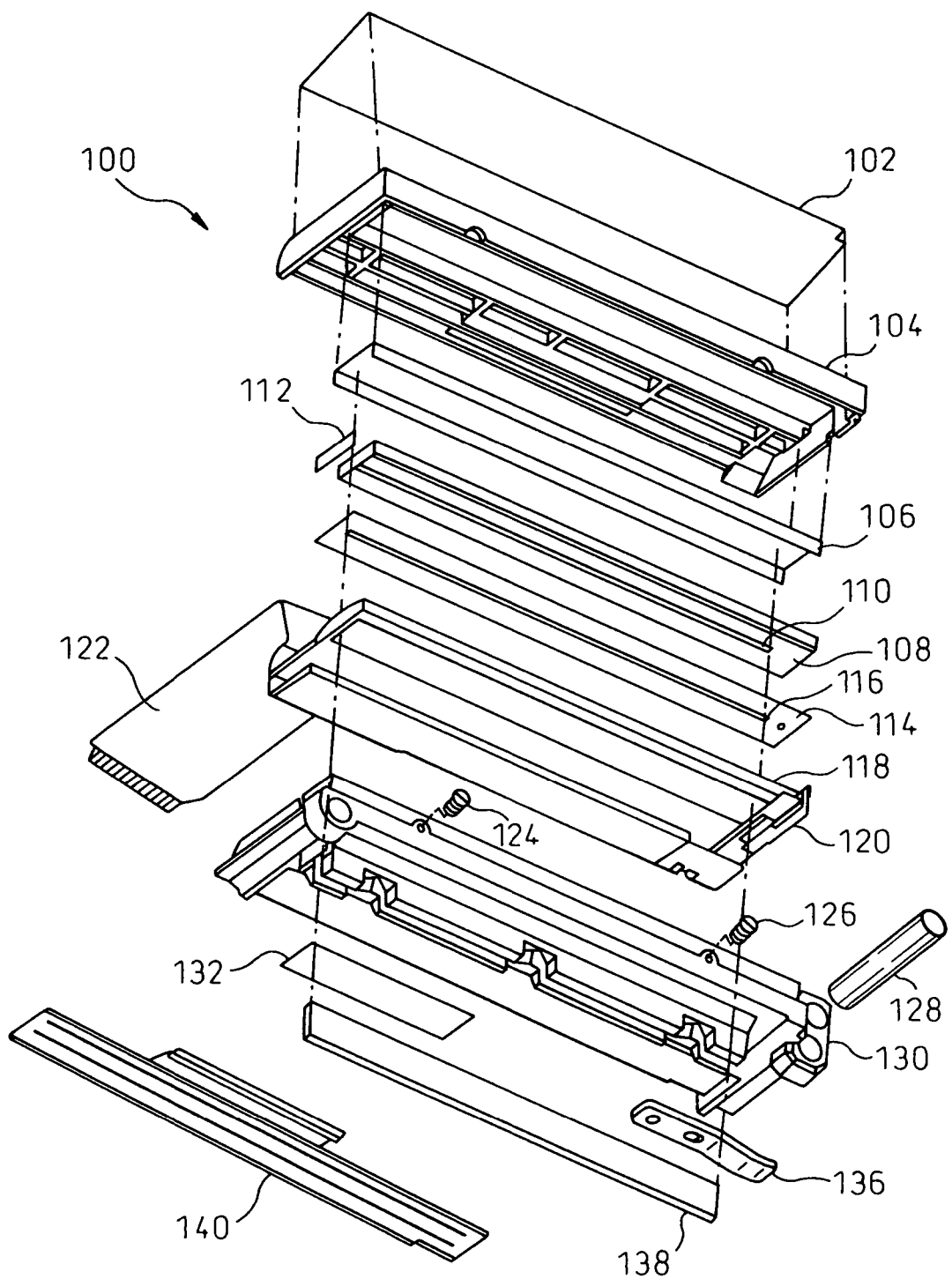
FIG. 4 is an exploded perspective view showing one example of an exposure head.
Figure 5:
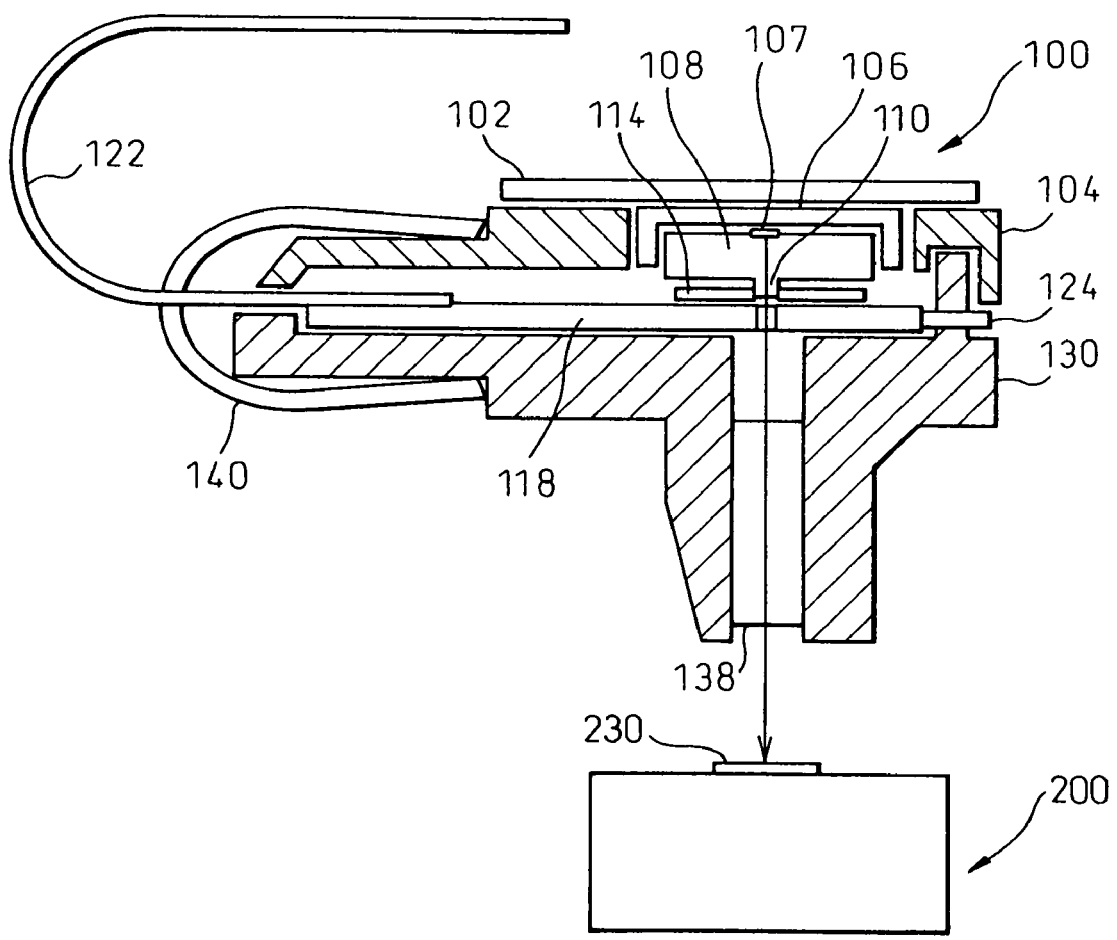
FIG. 5 is a cross-sectional view of the exposure head shown in FIG. 4.

Referring to FIGS. 4 and 5, a description will be given of the construction of the exposure head 100 used as the target to be measured in the system according to the present invention. FIG. 4 is an exploded perspective view of the exposure head 100, and FIG. 5 is a cross-sectional view of the exposure head 100. As shown, the exposure head 100 comprises an upper housing 104 and a lower housing 130 between which are arranged an upper reflective plate 106, a light guiding device 108, a mirror 112, a lower reflective plate 114, a liquid crystal shutter array 118, and LEDS 120. The upper housing 104 and the lower housing 130 are fixed together by a clip 140 so as not to be separated from each other.

A light shielding sheet 102 is attached to the upper surface of the upper housing 104 to block external light. Further, a serial number sheet 132 for identifying the exposure head 100 and a driving key 136 are attached to the lower surface of the lower housing in the figure, and a Selfoc lens array (registered trademark) 138 is fixed to a groove in the lower housing 130.

The upper reflective plate 106 is constructed so as to surround the light guiding device 108 and to reflect the light from the LEDS 120 so that the light can be selectively emitted from a protrusion 110 of the light guiding device 108. The reflective mirror 112 reflects the light from the LEDS 120 into the light guiding device 108, while a slit 116 formed in the lower reflective plate 114 serves as an escape for the protrusion 110 of the light guiding device 108. The liquid crystal shutter array 118 is positioned and fixed onto the lower housing 130, while adjusting the position of its light path, by adjusting screws 124 and 126. The LEDs 120, the light source of the exposure head 100, consist of red, green, and blue LEDs. A signal line 122 for controlling the driving time of each driving pixel in the liquid crystal shutter array 118 and for applying an electric current to the LEDs 120 is connected to the liquid crystal shutter array 118, and the other end of the signal line 122 is brought outside the exposure head 100 from between the upper and lower housings 104 and 130. Indicated at 128 in the figure is a bearing for moving the exposure head 100. The driving key 136 is a member for determining the driving timing, etc. of the exposure head together with a sensor, etc. not shown when driving the exposure head 100 by means of a ballscrew not shown and the bearing 128. The selfoc lens array 138 is an optical device for forming an erect image with unity magnification at the focus, and comprises a large number of cylindrical lenses arranged in overlapping fashion along the longitudinal direction.

Further, as shown in FIG. 5, a scattering film 107 is formed on the upper surface of the light guiding device 108 in the figure, extending along the longitudinal direction of the light guiding device 108 in order to concentrate the colored lights from the LEDs 120 in the direction of the liquid crystal shutter array 118 disposed directly below the light guiding device 108 in the figure. The scattering film 107 is formed by applying a white scattering substance in a straight line pattern. When the exposure head 100 is mounted on the measuring apparatus 200, the colored lights from the scattering film 107 are passed through the liquid crystal shutter array 108 and the SELFOC lens array 138, and focused on the CCD sensor array 230.

Figure 6:
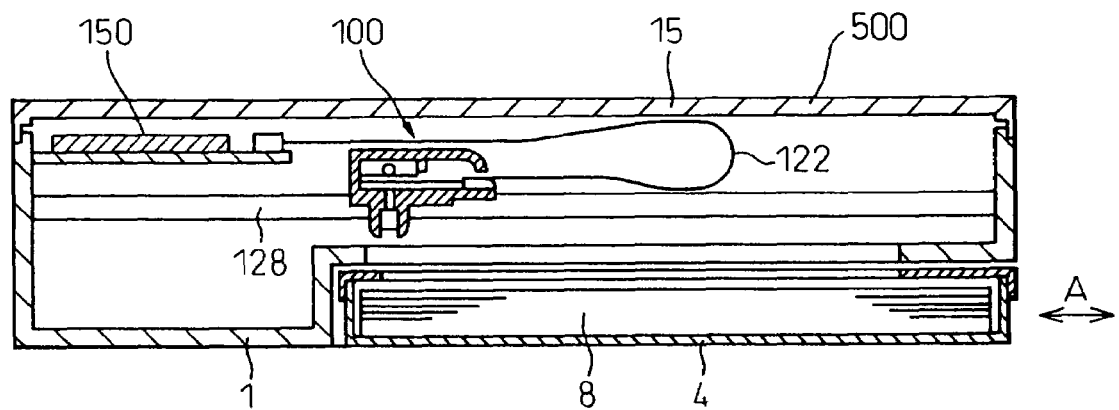
FIG. 6 is a cross-sectional view showing one example of an exposure apparatus according to the present invention.
Figure 7:
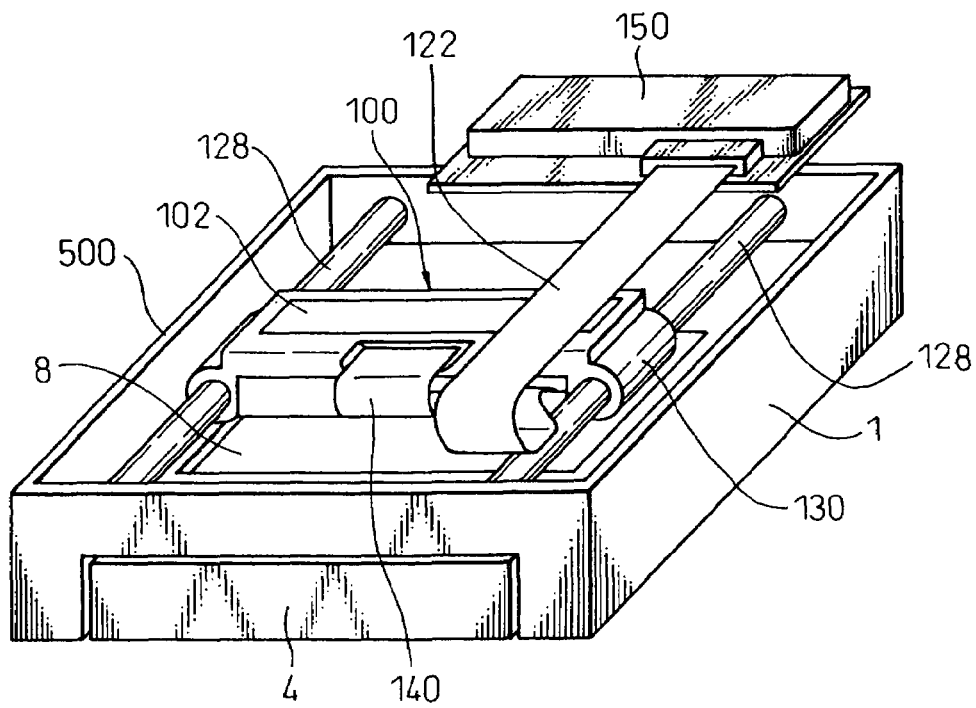
FIG. 7 is a perspective view of the exposure apparatus shown in FIG. 6.

FIG. 6 shows a cross-sectional view of the exposure apparatus 500, and FIG. 7 shows a perspective view with an upper lid 15 removed. The exposure apparatus 500 contains the exposure head 100 and the exposure control circuit 150 in an outer case 1. The exposure head 100 and the exposure control circuit 150 are connected by the signal line 122. The exposure control circuit 150 is fixed to the interior side of the outer case 1. With two bearing rods 128 passed through openings formed in the lower housing 130, the exposure head 100 is supported movably along the bearing rods 128.

A cassette 4 for holding recording media (print paper) 8 is provided below the outer case 1 in the figure in such a manner as to be detachable (in the direction of arrow A).

The exposure head 100, while moving along the bearing rods 128, performs image formation (for example, the formation of a latent image) on the recording media 8 held in the cassette 4.

The exposure apparatus 500 shown in FIGS. 6 and 7 is only an example, and the invention is not limited to the illustrated construction. For example, the exposure apparatus 500 may be constructed so that the recording medium 8 is moved while holding the exposure head 100 fixed. The cassette 4 may be provided separately from the exposure apparatus 500. Further, the exposure apparatus 500 may be constructed by incorporating a processing unit for developing a latent image formed on a recording medium. Furthermore, the exposure apparatus 500 may be constructed using only the exposure head 100 and the exposure control circuit 150.

Figure 8:
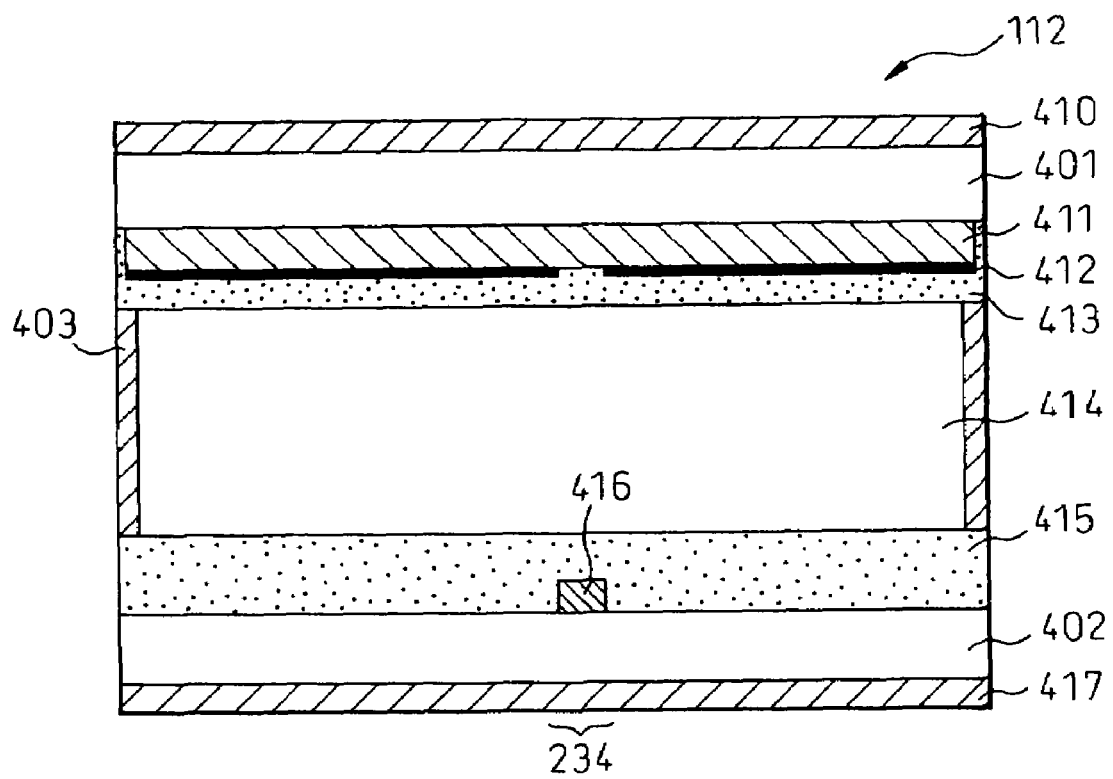
FIG. 8 is a cross-sectional view of a liquid crystal shutter used in the exposure head shown in FIG. 4.

FIG. 8 shows a cross-sectional view of the liquid crystal shutter array 118 shown in FIGS. 4 and 5. In FIG. 8, a transparent common electrode 411 made of a transparent ITO thin film or the like is formed over the entire lower surface of an upper substrate 401, and is covered with an alignment film 413 of polyimide or the like. On the upper surface of a lower substrate 402 are formed fine transparent pixel electrodes 416 which are covered with an alignment film 415. The outer peripheries of the two substrates are bonded together with a seal member 403 formed from an epoxy resin or the like, and a liquid crystal 414 is sealed between the alignment films 413 and 415 formed on the respective substrates. The thickness of the liquid crystal 414 is chosen to be 5 μm. The transparent common electrode 411 is also covered with a light blocking layer 412 formed from a chromium material or the like, and a slit is formed in the portion of the light blocking layer 412 which corresponds to the position of the transparent pixel electrode 416 so that light can pass only through that portion. Polarizers 410 and 417 are attached to the outside surfaces of the respective substrates. The liquid crystal 414 operates, for example, in an STN mode with a twist angle of 240°, and the two polarizers 410 and 417 can be arranged with their polarization axes oriented relative to each other at an angle that matches the twist angle.

Further, the driving pixels 234, each formed between the transparent common electrode 412 and one of the transparent pixel electrodes 416, are arranged in a straight line to form the liquid crystal shutter array. The driving pixels 234 forming the liquid crystal shutter array each have a length (b) of 150 μm (or 200 μm) and a width (e) of 76 μm, and are arranged at a pitch (f) of 100 μm, as previously explained with reference to FIG. 3.

Figure 9A:
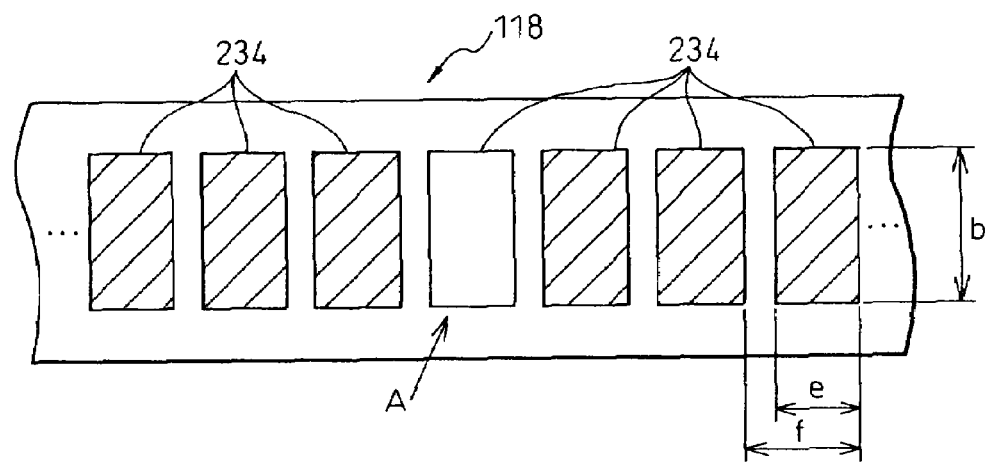
FIG. 9A is a diagram showing one example of the shape of openings in a liquid crystal shutter array.
Figure 9B:
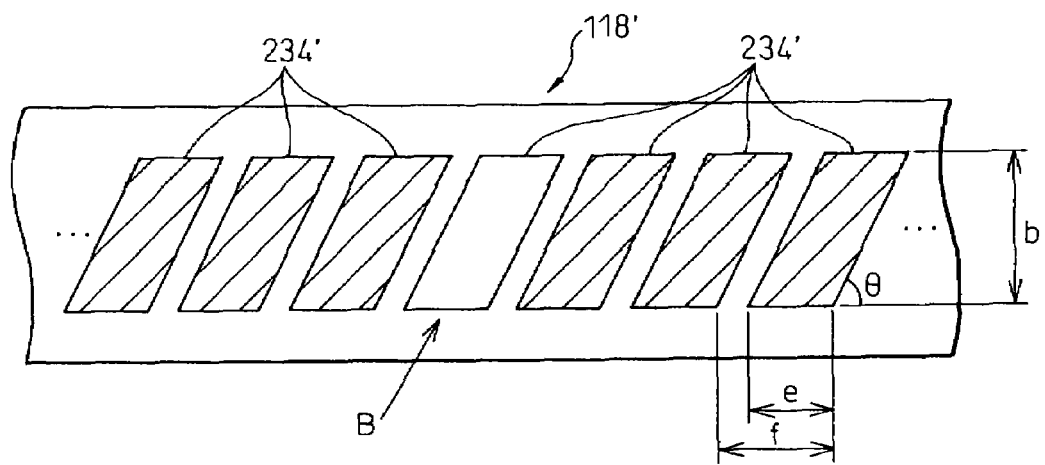
FIG. 9B is a diagram showing another example of the shape of openings in a liquid crystal shutter array.

FIG. 9 is a diagram showing driving pixels in the liquid crystal shutter array. FIG. 9A shows the liquid crystal shutter array described with reference to FIG. 3; as shown, the driving pixels 234 are rectangular in shape. The length "b" of each driving pixel 234 is 150 μm (or 200 μm), the width "e" is 76 μm, and the pitch "f" is 100 μm. FIG. 9B shows another liquid crystal shutter array 118'. The example shown in FIG. 9B has openings 234' tilted at a prescribed angle in the arrangement direction of the driving pixels (hereinafter called the "tilted driving pixels"). In FIG. 9B, the length "b" of each driving pixel 234' is 150 μm (or 200 μm), the width "e" is 76 μm, the pitch "f" is 100 μm, and the tilt θ is about 60°.

In the present embodiment, either liquid crystal shutter array can be used. However, when the tilted driving pixels are used, unexposed portions of the photosensitive material, which could arise due to gaps between the driving pixels, can be eliminated. Accordingly, when the liquid crystal shutter array 118' having the tilted driving pixels 234' is used, it becomes possible to prevent vertical stripes from being formed due to the unexposed portions remaining on the photosensitive material. However, as will be described later, when the tilted driving pixels are used, the problem can arise that peak positions cannot be detected distinctly when measuring the amounts of light.

Here, the tilt θ is preferably set in the range of 45° to 80° so that the gap between each driving pixel can be covered.

Figure 10:
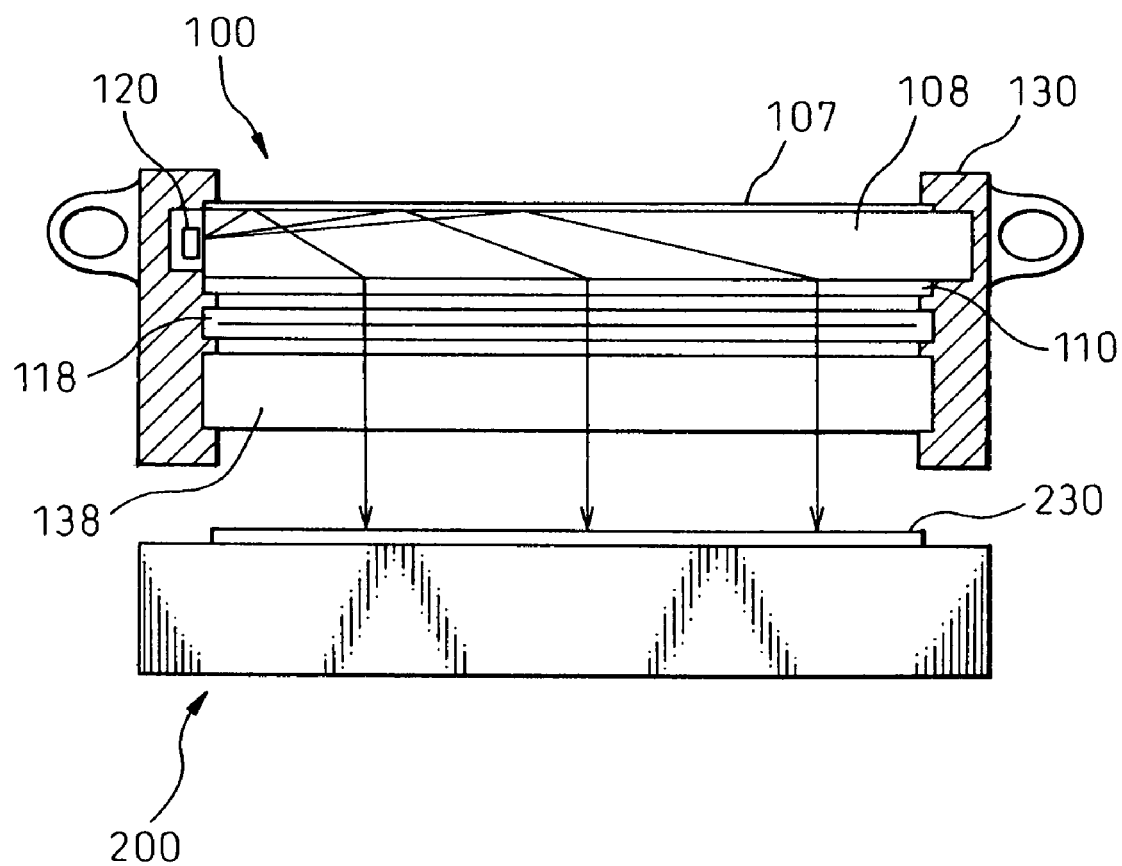
FIG. 10 is a diagram for explaining a light path in the system.

FIG. 10 is a diagram for explaining the light path leading from the LEDs 120 contained in the exposure head 100 to the CCD line sensor 230. As shown in FIG. 10, the light emitted from each LED 120 is introduced into the light guiding device 108 along the longitudinal direction thereof, and is reflected downward by the scattering film 107 and directed toward the liquid crystal shutter array 118 through the lower protrusion 110 of the light guiding device 108. The light passed through each driving pixel 234 of the liquid crystal shutter array 118 in a controlled manner is focused on the CCD line sensor 230 through the SELFOC lens array 138. The exposure head 100 contains the LEDs of three colors, and the colored light emitted from each color LED is passed through the light path shown in FIG. 10 and focused on the CCD line sensor 230.

The exposure head 100 is designed so that the colored lights emitted from the respective color LEDs and emerging from the driving pixels 234 of the liquid crystal shutter array 118 have equal amounts of light, but there are cases where variations occur in the amount of light among the individual driving pixels. The reason for this will be described, by way of example, below.

First, the scattering film 107 is constructed to have a uniform width along the longitudinal direction of the light guiding device 108 in order to uniformly project light from the lower protrusion 110 of the light guiding device 108 toward the liquid crystal shutter array 118. However, it is difficult to form the scattering film 107 to have a perfectly uniform width along the longitudinal direction. As a result, subtle errors in the width of the scattering film 107 prevent the light from uniformly entering the driving pixels of the liquid crystal shutter array 118, and this causes random variations in the amount of light among the individual driving pixels.

Next, the driving pixels 234 of the liquid crystal shutter array 118 are formed so that the transmittance of each pixel varies in accordance with the voltage applied across the transparent electrodes forming the pixel, thereby making it possible to control the transmittance. However, it is difficult to make the light transmittance uniform across all the driving pixels, in particular, when each driving pixel is opened. Accordingly, even when uniform light is introduced into all the driving pixels, variations occur in the amount of light among the individual driving pixels.

Further, the light emerging from each driving pixel 234 of the liquid crystal shutter array 118 is focused through the selfoc lens array 138 which is constructed by arranging a large number of cylindrical lenses in overlapping fashion along the longitudinal direction. Accordingly, even when uniform light is introduced into the selfoc lens array 138, fluctuations occur in the emerging light corresponding with the arrangement cycle of the cylindrical lenses.

Because of the light-amount variations occurring among the individual driving pixels for the above and other reasons, if an exposure is performed on the photosensitive material by the exposure head 100, it has not been possible to form images of good quality. Accordingly, it becomes necessary to measure the amount of light of each driving pixel 234 in the exposure head 100 and to apply a shading correction so that an equal amount of light can always be obtained when data of the same grayscale level is applied to any particular driving pixel 234.

Figure 11:
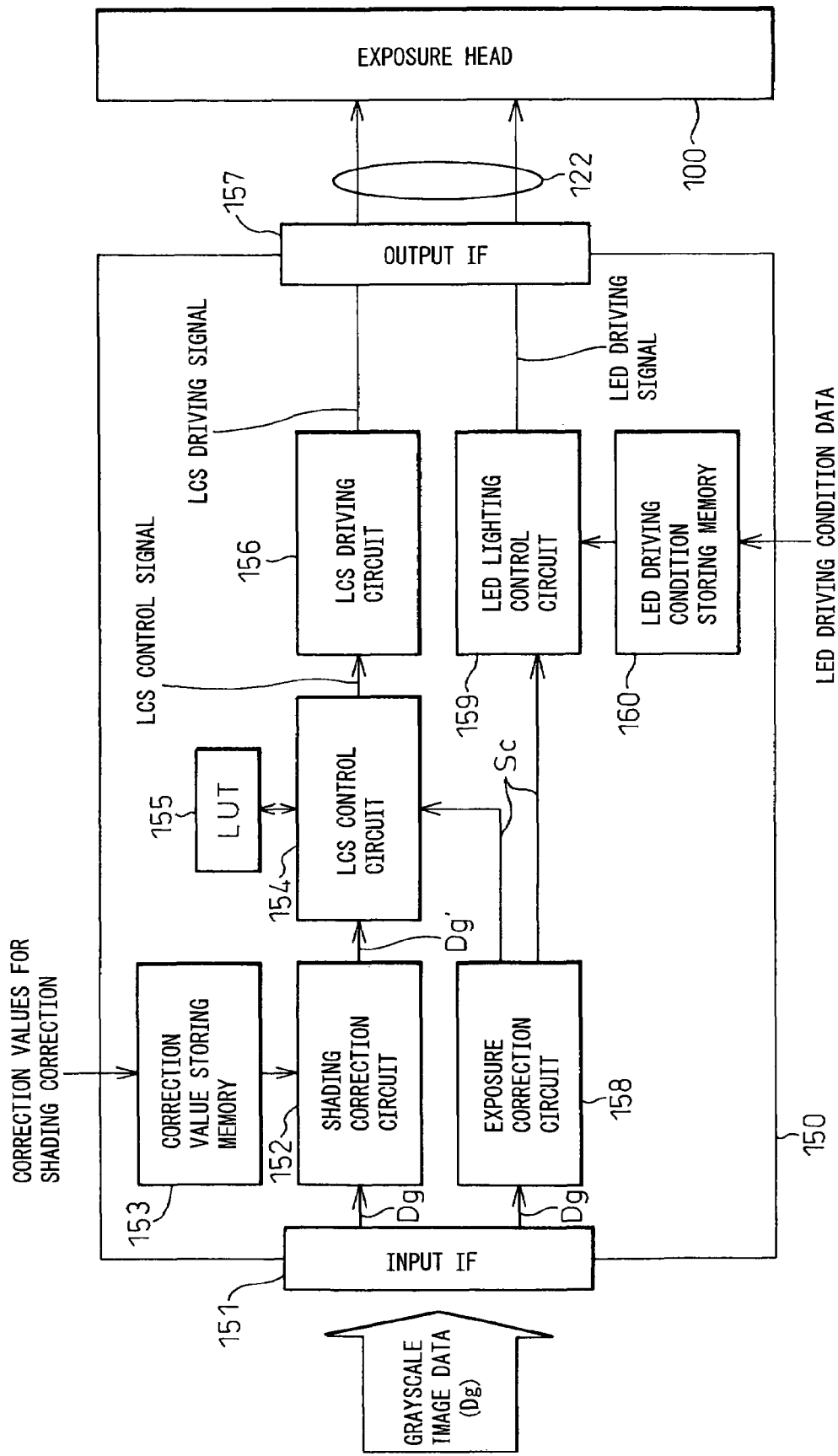
FIG. 11 is a conceptual diagram showing one example of an exposure control circuit.

FIG. 11 shows one example of the exposure control circuit 150. The exposure control circuit 150 includes: an input IF 151 via which grayscale image data Dg is input from a personal computer or the like; a shading correction circuit 152 for applying a shading correction to the grayscale image data Dg; a correction value storing memory 153 for storing shading correction data which the shading correction circuit 152 uses for shading correction; an LCS control circuit 154 which generates a control signal (LCS control signal) for driving the liquid crystal shutter array 118 by using the corrected grayscale image data Dg' and exposure timing data Sc; a look-up table (LUT) 155 which is used when generating the LCS control signal; and an LCS driving circuit 156 which generates a driving signal (LCS driving signal) for actually driving each individual pixel of the liquid crystal shutter array in accordance with the LCS control signal.

The exposure control circuit 150 further includes: an exposure correction circuit 158 which generates the exposure timing data Sc from the grayscale image data Dg; an LED lighting control circuit 159 which generates an LED driving signal for driving the LEDs 120 in accordance with the exposure timing data Sc and LED driving condition data; and an LED driving condition storing memory 160 for storing the LED driving condition data.

The LCS driving signal and the LED driving signal are transmitted to the exposure head via the signal line 122, and the liquid crystal shutter array 188 and the LEDs 120 are driven in accordance with the LCS driving signal and the LED driving signal, respectively.

It is assumed here that the correction values for the shading correction and the LED driving condition data (electric current value data), obtained as will be described later, are prestored in the correction value storing memory 153 and the LED driving condition storing memory 160, respectively.

Next, a description will be given of the operation for adjusting the value of the electric current to be applied to each LED and the method of determining the illuminance of each driving pixel.

Figure 12:
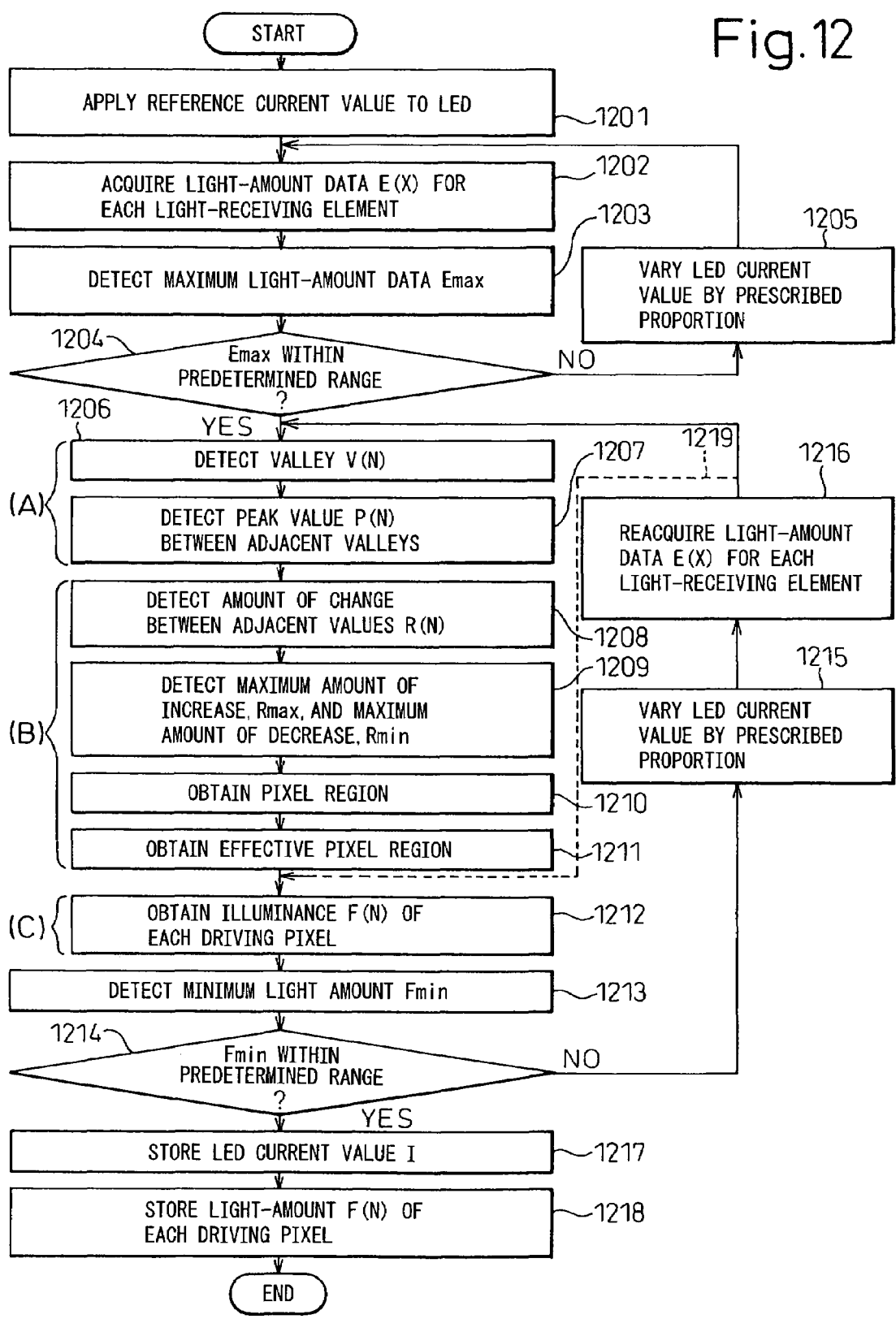
FIG. 12 is a flowchart for correcting an applied electric current value.

FIG. 12 shows a flow for correcting the value of the electric current to be applied to each LED 120 of the exposure head 100. Prior to starting the correction, the exposure head 100 to be measured is set in the prescribed position on the measuring apparatus 200, and the signal line 122 is inserted in the IF 240. After that, the operator enters a measurement start command on the PC 300, which is transmitted to the CPU 211 of the measuring apparatus 200 via the bus line 260 to start the measurement. Thereafter, the flow of FIG. 12 is carried out with the PC 300 cooperating with the CPU 211 of the measuring apparatus 200 in accordance with system control software stored in the PC 300.

First, a reference LED current of a predetermined value is applied from the electric current supply circuit 220 to a designated one of the LED devices 120 in the exposure head 100, and the designated LED device thus turns on (step 1201). The exposure head 100 of the present embodiment has LED devices of three colors (blue, green, and red), and the measurement is made for each color LED device. In the present embodiment, when performing the measurement, the liquid crystal shutter driving circuit 212 outputs an open control signal with a maximum driving time (corresponding to the highest grayscale level) for application to all the driving pixels of the liquid crystal shutter array 118. The control signal applied to each driving pixel during the measurement need not necessarily be one corresponding to the maximum driving time, but a control signal corresponding to an intermediate driving grayscale level may be applied.

Figure 13:
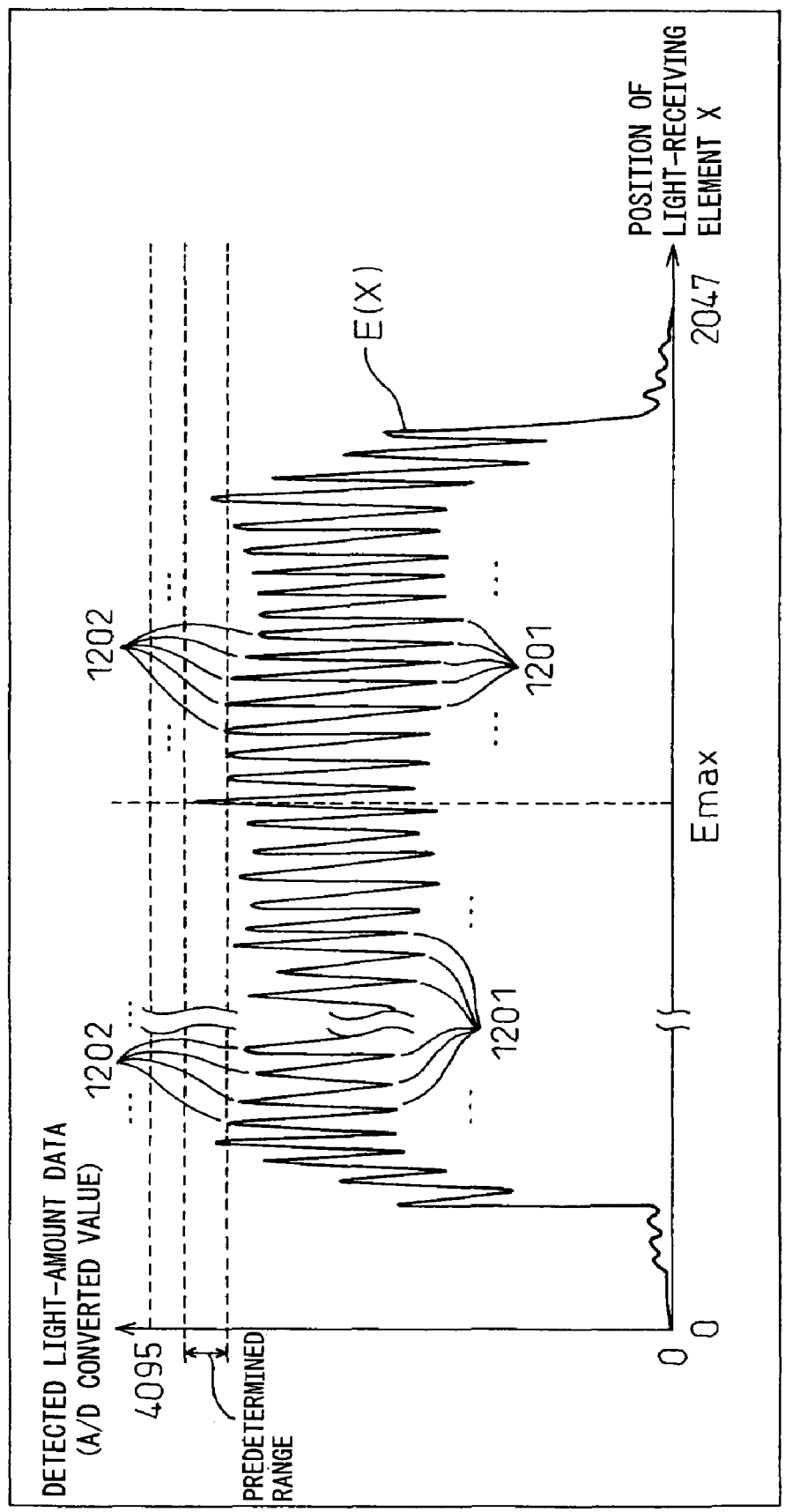
FIG. 13 is a diagram showing one example of the distribution of light-amount data detected by the CCD line sensor.

Next, the amount of received light from all the light-receiving elements 232 of the CCD line sensor 230 is detected by the received light amount detecting circuit 274, and integrated by the integrator circuit 272, and the result is converted by an A/D conversion circuit not shown into a digital signal which is detected as light-amount data E(X) by the CPU 211 (step 1202). In the present embodiment, as there are 2048 light-receiving elements 232 as previously described, 2048 pieces of light-amount data E(X) (X is 0 to 2047) are acquired. The distribution of the acquired light-amount data E(X) is shown in FIG. 13. As shown in FIG. 13, the light-amount data are shown as output values (0 to 4095) of the A/D conversion circuit.

Next, light-amount data Emax having the largest value is obtained from among the light-amount data E(X) of all the light-receiving elements (step 1203), and it is determined whether or not Emax lies within a predetermined range (step 1204). The reason for making this determination is that, if Emax is large and the value exceeds the A/D conversion limit of the A/D conversion circuit, the data after conversion is highly likely to saturate, resulting in an inability to obtain a good measurement result. Conversely, if Emax is small, this means that the data is generally compressed, degrading the detectability of valleys, etc. to be described later, and a good measurement result cannot be obtained. In the present embodiment, the setting is made so that Emax lies within a range not higher than 90% but not lower than 80% of the A/D conversion limit.

If Emax is outside the predetermined range, the process proceeds to step 1205 where the value of the reference LED current applied in step 1201 is varied by a prescribed proportion, and the process from step 1202 to 1204 is repeated. In the present embodiment, the prescribed proportion is 10%. The LED current value is reduced by 10% if Emax is higher than the upper limit of the predetermined range, and is increased by 10% if Emax is lower than the lower limit of the predetermined range.

If LEDs of uniform quality can be obtained, for example, the above steps 1201 to 1205 may be omitted.

If Emax is within the predetermined range, the process proceeds to step 1206 where the position of each valley V(N) is detected from the detected light-amount data E(X). As an example, the detected valley positions are shown at 1201 in FIG. 13. Here, N is a serial number indicating each valley, and is 0 or an integer not smaller than 1. The valleys V(N) appear at positions corresponding to those light-receiving elements 232 which are located at positions between the driving pixels 234 and not directly below the driving pixels, as shown by $Y_1$ to $Y_3$ in FIG. 3. Accordingly, the positions of the driving pixels can be identified by detecting the valleys V(N).

Next, a peak value P(N) between adjacent valleys V(N) and V(N+1) is detected from the detected light-amount data E(X) (step 1207). As an example, peak values are shown at 1202 in FIG. 13. At the same time, the peak position Xp at which the peak value P(N) is detected, that is, the number of the light-receiving element from which the peak value P(N) is detected, is obtained.

Figure 14:
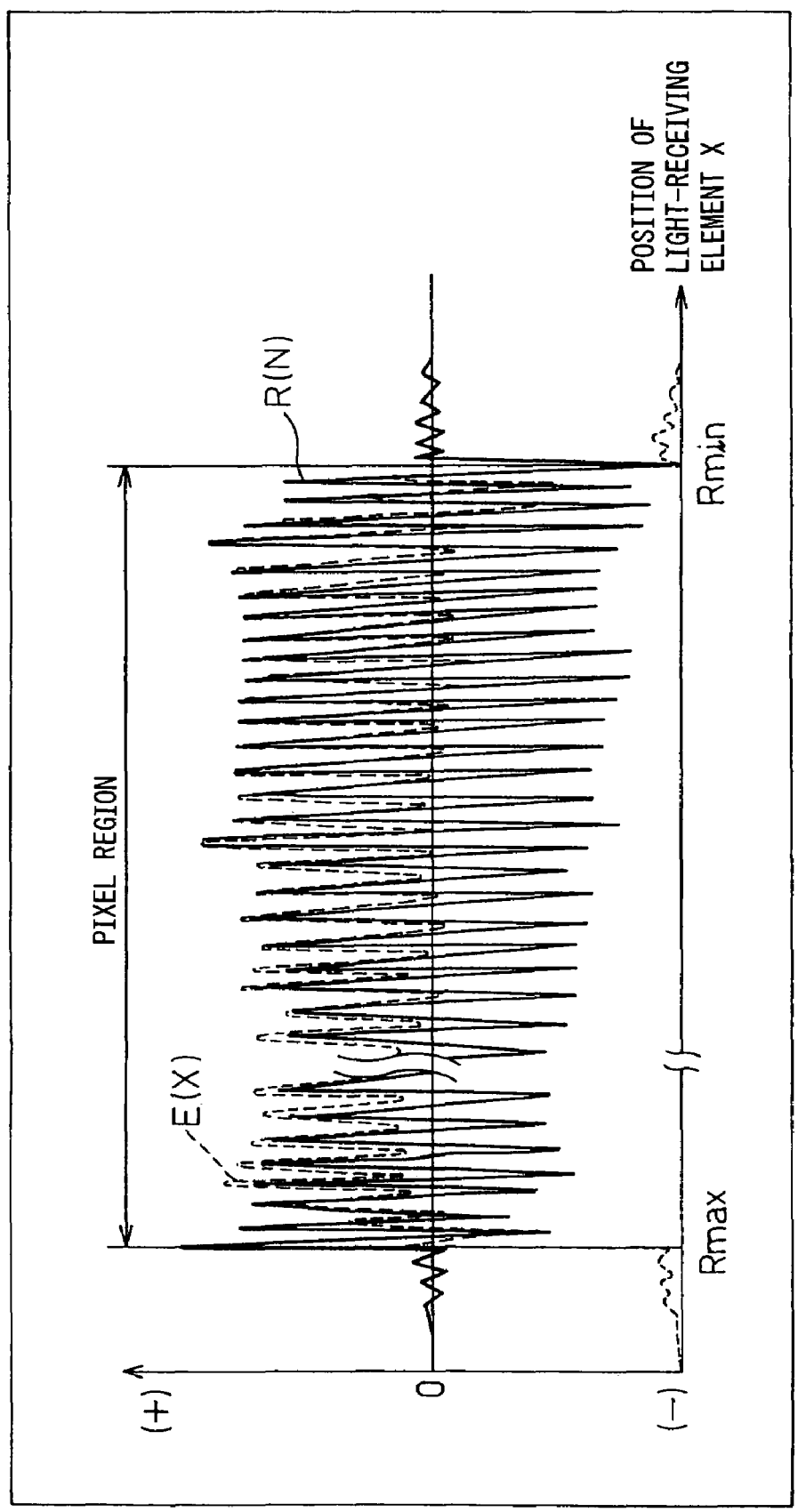
FIG. 14 is a diagram showing one example of the distribution of the amount of change between adjacent values.

Next, the amount of change between adjacent values R(N), that is, the amount of change between the valley V(N) and its adjacent peak value P(N), is detected (step 1208). The amount of change between adjacent values R(N) is obtained first between the valley V(N) and its adjacent peak value P(N), and then between the peak value P(N) and its adjacent valley V(N+1). As an example, the amount of change between adjacent values R(N) is shown in FIG. 14 for the case where the light-amount data E(X) shown in FIG. 13 is detected. Here, N is a serial number indicating the amount of change between a particular pair of adjacent values, and is 0 or an integer not smaller than 1. In the illustrated example, the direction in which the value rises from the valley V(N) to the adjacent peak value P(N) is indicated by (+), and the direction in which the value falls from the peak value P(N) to the adjacent valley V(N+1) is indicated by (−).

Next, a maximum amount of increase, Rmax, and a maximum amount of decrease, Rmin, are obtained (step 1209). Rmin and Rmax are shown by way of example in FIG. 14.

Figure 15:
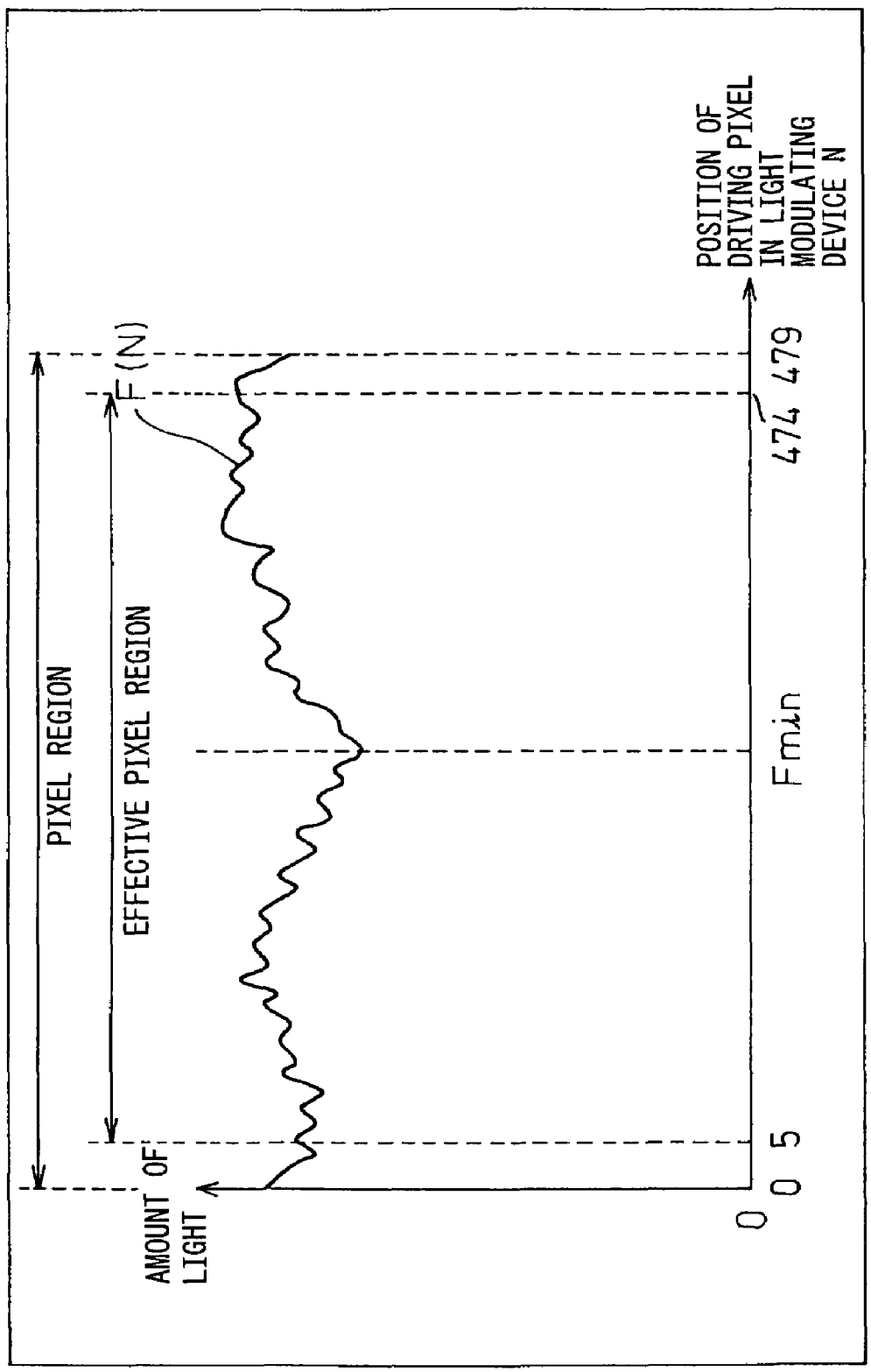
FIG. 15 is a diagram showing one example of the distribution of the amount of light for each driving pixel.

Then, by reference to the positions of Rmin and Rmax, the region between them is recognized as the pixel region (step 1210). One example of the thus recognized pixel region (N=0 to 479) is shown in FIG. 15.

Next, five pixels are removed from each edge of the obtained pixel region, and the remaining region is taken as the effective pixel region (step 1211). One example of the effective pixel region (N=5 to 474) is shown in FIG. 15. The pixels located at the edges of the liquid crystal shutter array 118 may have driving characteristics different from those of the driving pixels located in the center, due to such factors as the structure of the liquid crystal shutter and the arrangement of the transparent electrodes. Accordingly, five pixels at each edge are not used for image recording, and are therefore removed so that the light amounts associated with such pixels will not be measured or stored. As a result, the effective pixel region is N=5 to 474.

Next, the peak value P(N) contained in the effective pixel region is taken as the illuminance F(N) of the Nth driving pixel in the liquid crystal shutter array 118 (480 pixels in the present embodiment), that is, the amount of light emerging from that driving pixel (step 1212).

For the light-receiving elements located at the edges and outside the region of the driving pixels 232 of the liquid crystal shutter array 118, as shown in FIG. 3, the amount of received light decreases drastically; accordingly, the pixel positions are determined by assuming that the first driving pixel (N=0) is located at the position (Rmax) where the amount of received light first rises abruptly, and that the last driving pixel (N=479) is located at the position (Rmin) where the amount of received light abruptly falls at the end. The distribution of the illuminance F(N) obtained in the above procedure is shown in FIG. 15. In FIG. 15, the distribution of the amount of light is shown by drawing a curve in such a manner as to join the amounts of light corresponding to the respective driving pixels.

Next, a minimum light amount Fmin is detected from the illuminance F(N) within the effective pixel region (N=5 to 474) (step 1213), and it is determined whether or not Fmin lies within a predetermined light-amount range (step 1214). Here, the value of Fmin is determined according to the kind of the photosensitive material used with the exposure head 100; in particular, the brightness setting for the exposed image is taken into account when determining the value.

If Fmin is outside the predetermined light-amount range, then in step 1215 the value of the electric current being applied to the LED at that instant in time is varied by a prescribed proportion (5%), and the current thus varied is applied to the LED from the electric current supply circuit 220, to acquire the light-amount data over again for each light-receiving element as in step 1202 (step 1216). Here, if Fmin is lower than the lower limit of the predetermined range, the current value is varied in a direction that increases the LED current; conversely, if Fmin is higher than the upper limit of the predetermined range, the current value is varied in a direction that reduces the LED current. Thereafter, the process from step 1206 to step 1216 is repeated, and the value of the electric current applied to the LED is varied until Fmin falls within the predetermined light-amount range. In the above process, if Fmin is outside the predetermined range, the adjustment required here should normally be a fine adjustment, because control is already performed in accordance with the loop of steps 1202 to 1205 so that Emax falls within the predetermined range. However, if there is any dust adhering to the driving pixel corresponding to Fmin, or in the event of failure of the LED 120, an extensive adjustment procedure would be required for bringing Fmin within the predetermined range (step 1215). In that case, it is preferable to not perform the Fmin adjustment step but to consider the exposure head 100 defective.

If, in step 1214, Fmin is within the predetermined light-amount range, the process proceeds to step 1217. In step 1217, the LED current value at that instant in time is stored in the LED control condition storing memory 213 and, at the same time, control data concerning the driving time of each driving pixel of the liquid crystal shutter array 118 at that instant in time (the data defining the conditions for opening each driving pixel) is stored in the liquid crystal shutter driving condition storing memory 214.

Next, the illuminance F(N) at that instant in time is stored in the light-amount storing memory 215 for the shading correction described later (step 1218), to complete the measurement of the amount of light of each driving pixel.

The illuminance (F(N), etc.) of each driving pixel 234 of the liquid crystal shutter array 118, stored in the light-amount storing memory 215, can be output from the PC 300 (displayed or printed) and used for various purposes. In the present embodiment, the light-amount measurement has been performed by setting the exposure head 100 to be measured onto the measuring apparatus 200, but alternatively, the measuring apparatus may be incorporated into an image forming apparatus having an exposure head.

As described above, as the light-receiving elements, each smaller in width than each driving pixel of the liquid crystal shutter array, are arranged so that a plurality of light-receiving elements correspond to one driving pixel, the amount of light can be measured by accounting for interactions from a plurality of driving pixels, thus making it possible to accurately measure the amount of light without using an image actually formed on a photosensitive member.

Furthermore, as the amount light is not measured indirectly from the density of an image actually formed on a photosensitive material, but is measured by using the data acquired from the light-receiving elements disposed opposite the liquid crystal shutter array, the position of each driving pixel can be detected accurately, and the amount of light can thus be measured with higher accuracy.

Moreover, as the amount of light can be measured accurately without using an image actually formed on a photosensitive material, the time for developing the photosensitive material can be eliminated, making it possible to measure the amount of light quickly.

A method for obtaining correction values for shading correction will be described below.

Figure 16:
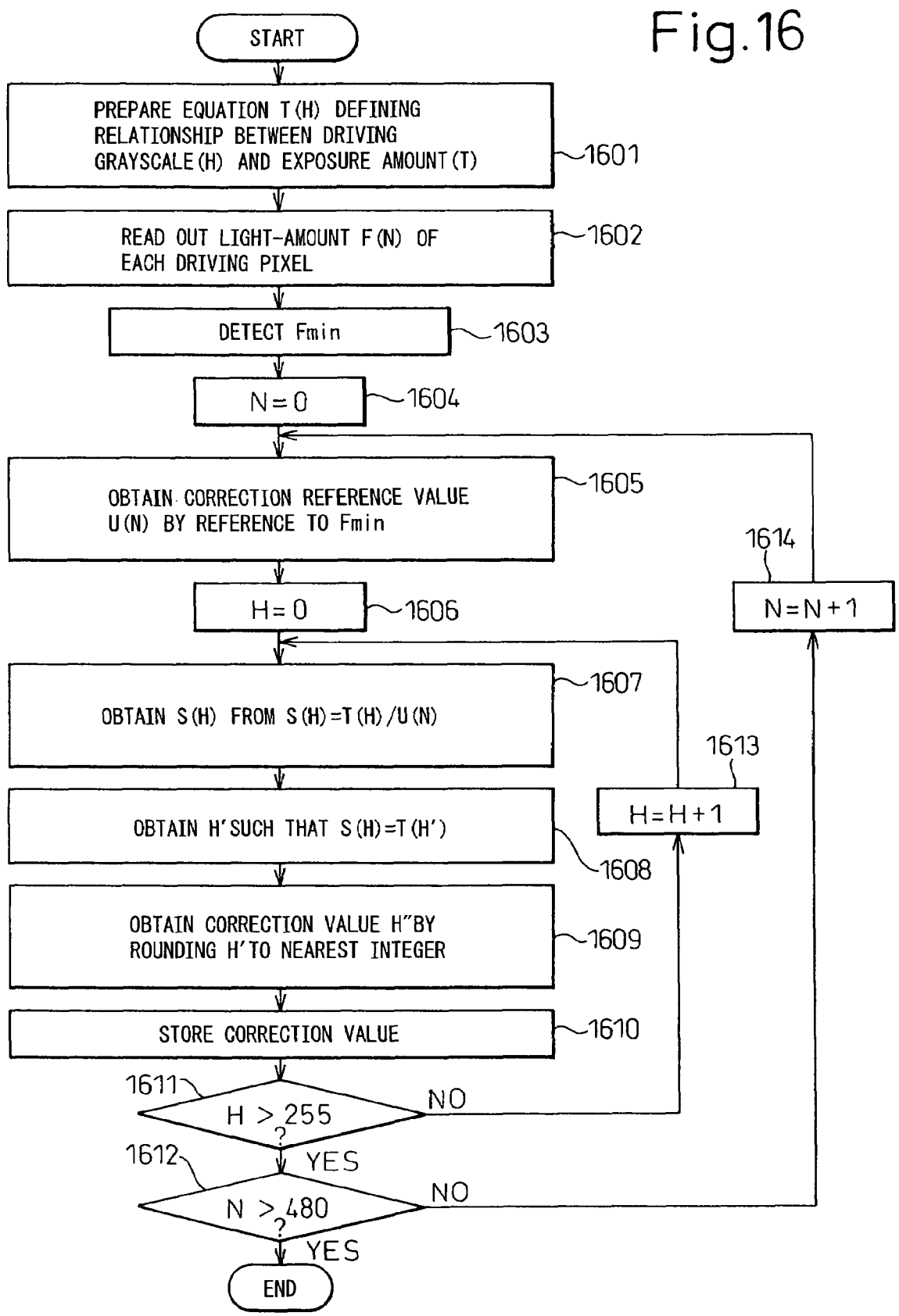
FIG. 16 is a flowchart for obtaining correction values for shading correction.

FIG. 16 shows a flow for obtaining correction values for shading correction by using the illuminance F(N) stored in the light-amount storing memory 215 in step 1218 of FIG. 12.

In this case, P(N) is set equal to F(N) in step 1212 of FIG. 12. This means that the peak value P(N) between the valleys V(N) of the detected light-amount data E(X) is used as a representative value of each driving pixel and hence as the illuminance for the shading correction.

The flow of FIG. 16 may be carried out following the flow of FIG. 12, with the PC 300 cooperating with the CPU 211 of the measuring apparatus 200 in accordance with the system control software stored in the PC 300, or may be carried out separately in the PC 300 alone.

First, a relational equation T(H) defining the relationship between driving grayscale (H) and normalized exposure illumination amount T, common to all the driving pixels of the liquid crystal shutter array 118, is prepared (step 1601). The details of the relational equation T(H) will be described later.

Next, the illuminance values F(N) of all the driving pixels, measured and stored in accordance with the flow of FIG. 12, are read out from the light-amount storing memory 215 (step 1602).

Then, the minimum light amount Fmin is detected from among the illuminance values F(N) of the driving pixels (step 1603).

Next, N is set equal to 0, that is, the 0th driving pixel 234 is selected (step 1604).

Then, by reference to Fmin detected in step 1603, a correction reference value U(N) for the Nth driving pixel is obtained (step 1605). Here, U(N) can be obtained from the following equation.

$$U(N)=Fmin/F(N)$$

Figure 17:
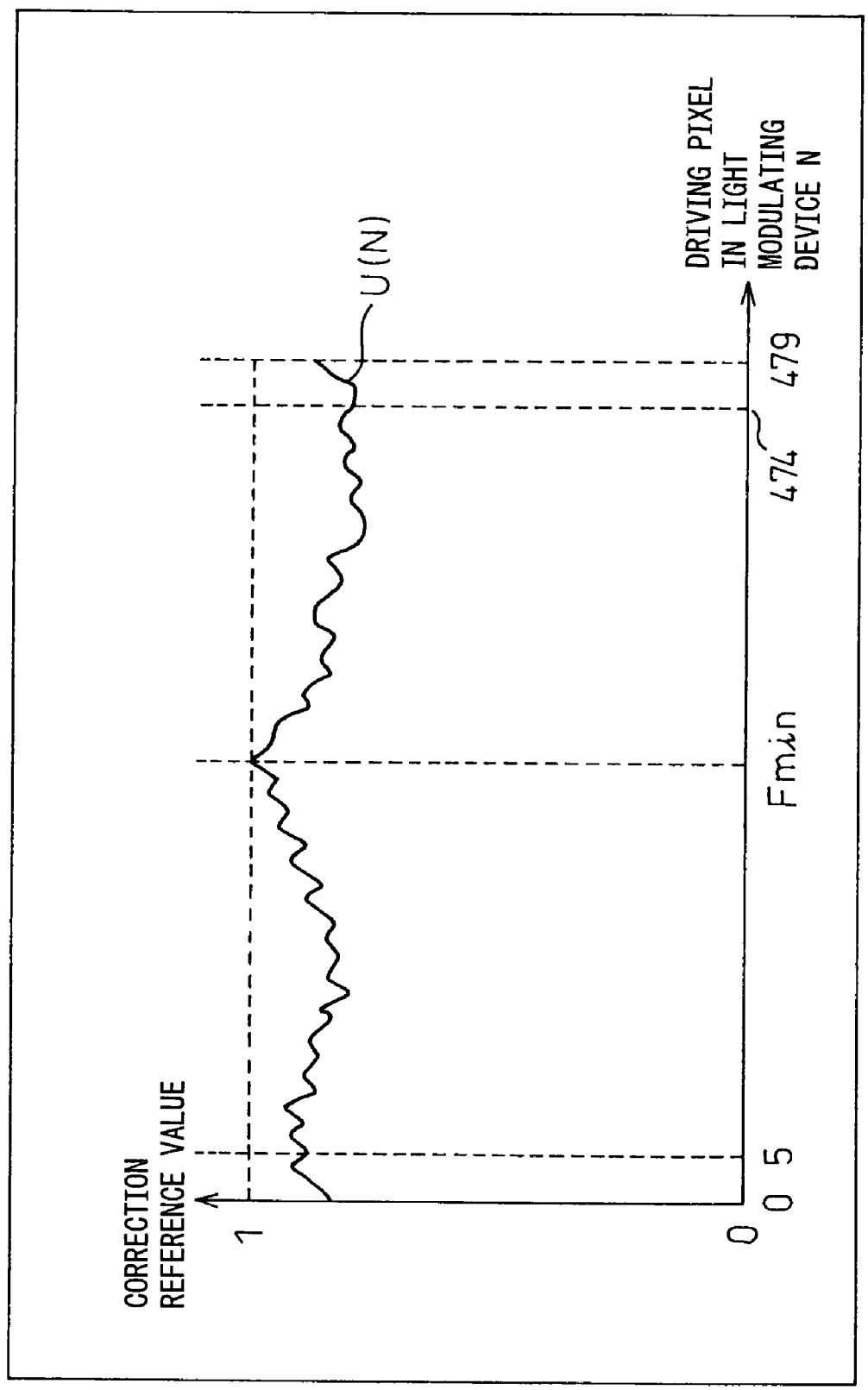
FIG. 17 is a diagram showing one example of the distribution of correction reference values.

Correction reference values U(N) are shown by way of example in FIG. 17 for the case where the illuminance values F(N) shown in FIG. 15 are read out of the light-amount storing memory 215. The correction reference value for the pixel corresponding to the minimum light amount Fmin is 1.00.

Next, H is set to 0, that is, the correction value for the driving grayscale level 0 is set (step 1606).

Next, the exposure illumination amount S(H) necessary when the driving grayscale level H is input is obtained for the Nth driving pixel from the correction reference value U(N) and the relational equation T(H) by using the following equation (step 1607).

$$S(H)=T(H)/U(N)$$

Next, a real number value H' that satisfies S(H)=T(H') is obtained for the Nth driving pixel (step 1608). H' represents the driving grayscale level that is necessary to obtain the same exposure illumination amount when the driving grayscale level H is given to the Nth driving pixel as when the driving grayscale level H is given to the driving pixel corresponding to the minimum light amount Fmin. That is, the shading correction is performed by changing H to H' when the driving grayscale level H is given to the Nth driving pixel.

Next, a correction value H" with an integer value is obtained by rounding H' to the nearest integer (step 1609). This is because the system containing the exposure head 100 of the present embodiment can only handle driving grayscale level data having an integer value 0 or 1 to 255. Accordingly, this step can be omitted depending on the situation.

Next, the correction value H" obtained in step 1609 is stored in the correction value storing memory 216 (step 1610).

Thereafter, the same process (steps 1607 to 1611 and 1613) is repeated for the Nth driving pixel until the process is completed for all the driving grayscale levels (0 to 255), and further, the same process as described above (steps 1605 to 1614) is repeated for all the driving pixels (N=0 to 479), after which the flow is terminated.

Here, T(H) is a relational equation that applies in common to all the driving pixels of the liquid crystal shutter array 118, and defines the relationship between the driving grayscale (H) and the normalized exposure illumination amount T. The relational equation T(H) is obtained in advance according to the liquid crystal shutter array 118 used in the exposure head 100 and the photosensitive material used, from the relationship between the driving characteristic of the liquid crystal shutter array 118, shown in FIG. 18, and the sensitivity characteristic of the photosensitive material used, shown in FIG. 19.

Figure 18:
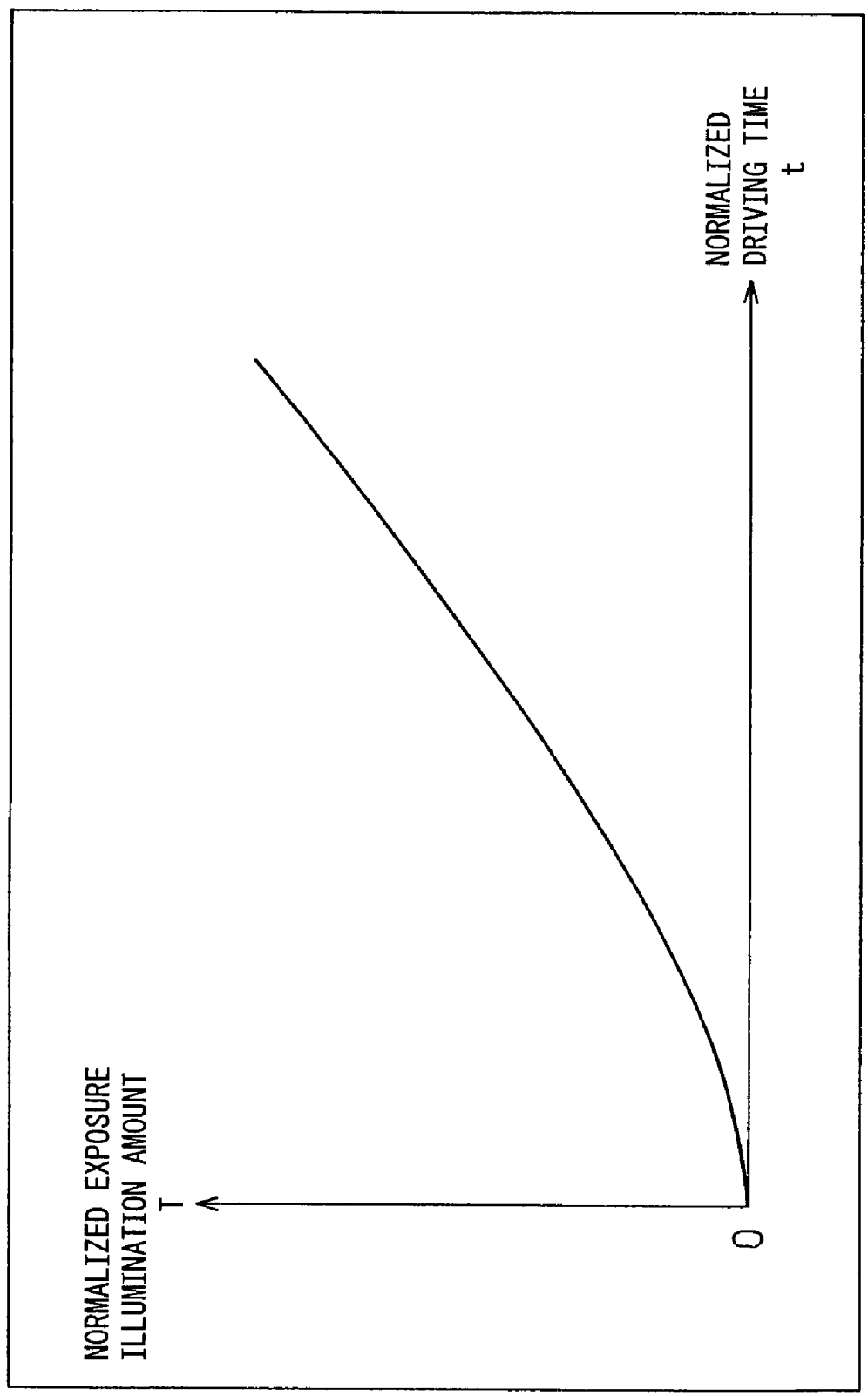
FIG. 18 is a diagram showing one example of the driving characteristic of driving pixels in the liquid crystal shutter array.
Figure 20:
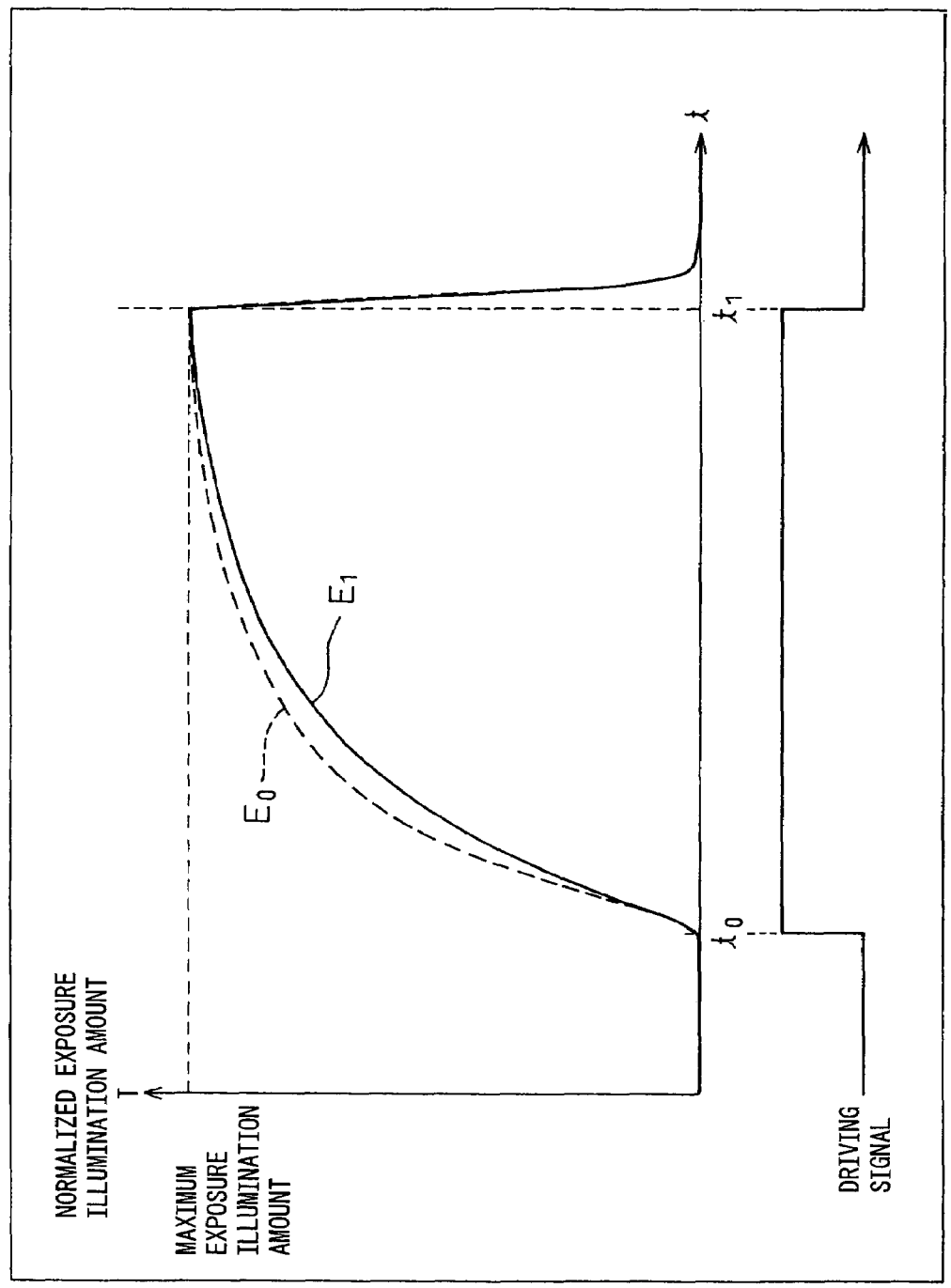
FIG. 20 is a diagram showing the relationship between normalized exposure light amount and normalized driving time for the driving pixels in the liquid crystal shutter array.

The driving characteristic of the liquid crystal shutter array 118, shown in FIG. 18, depicts the relationship between the normalized exposure illumination amount T and the driving time t (the time that the driving pixel is opened to transmit light) for each driving pixel of the liquid crystal shutter array 118. The graph showing the driving characteristic in FIG. 18 is not linear because the normalized exposure illumination amount T for each driving pixel of the liquid crystal shutter array 118 has the characteristic such as shown in FIG. 20 with respect to the control signal for the driving pixel. More specifically, when the control signal is applied that opens the driving pixel at $t_0$ and closes the driving pixel at $t_1$, the amount of exposure illumination from the driving pixel of the liquid crystal shutter array does not instantly rises to the maximum but gradually approaches the maximum exposure amount. In FIG. 20, graph $E_1$ shows the behavior of a pixel located in the center portion (N=20 to 460) of the liquid crystal shutter array 118, while graph $E_0$ shows the behavior of a pixel located in an edge portion (N=0 to 19 or 461 to 479) of the liquid crystal shutter array 118. The behaviors of the liquid crystal pixels differ between those located in the edge portions and those located in the center portion, because the driving pixels located in the edge portions are close to the seal member 403; that is, it is believed that impurities, uncured resin, etc. resulting from the formation of the seal member 403 made of resin affect the alignment film or the liquid crystal located close to the seal member 403.

Usually, the difference between $E_1$ and $E_0$ is very small; therefore, a graph depicting the driving characteristic such as shown in FIG. 18 may be obtained based only on $E_1$, and T(H) may be obtained based on the graph. However, when a further detailed shading correction is desired, it is preferable to obtain in advance $T_1(H)$ based on $E_1$ and $T_0(H)$ based on $E_0$ and to select the appropriate relational equation for use in accordance with the number or the position of each driving pixel.

Figure 19:
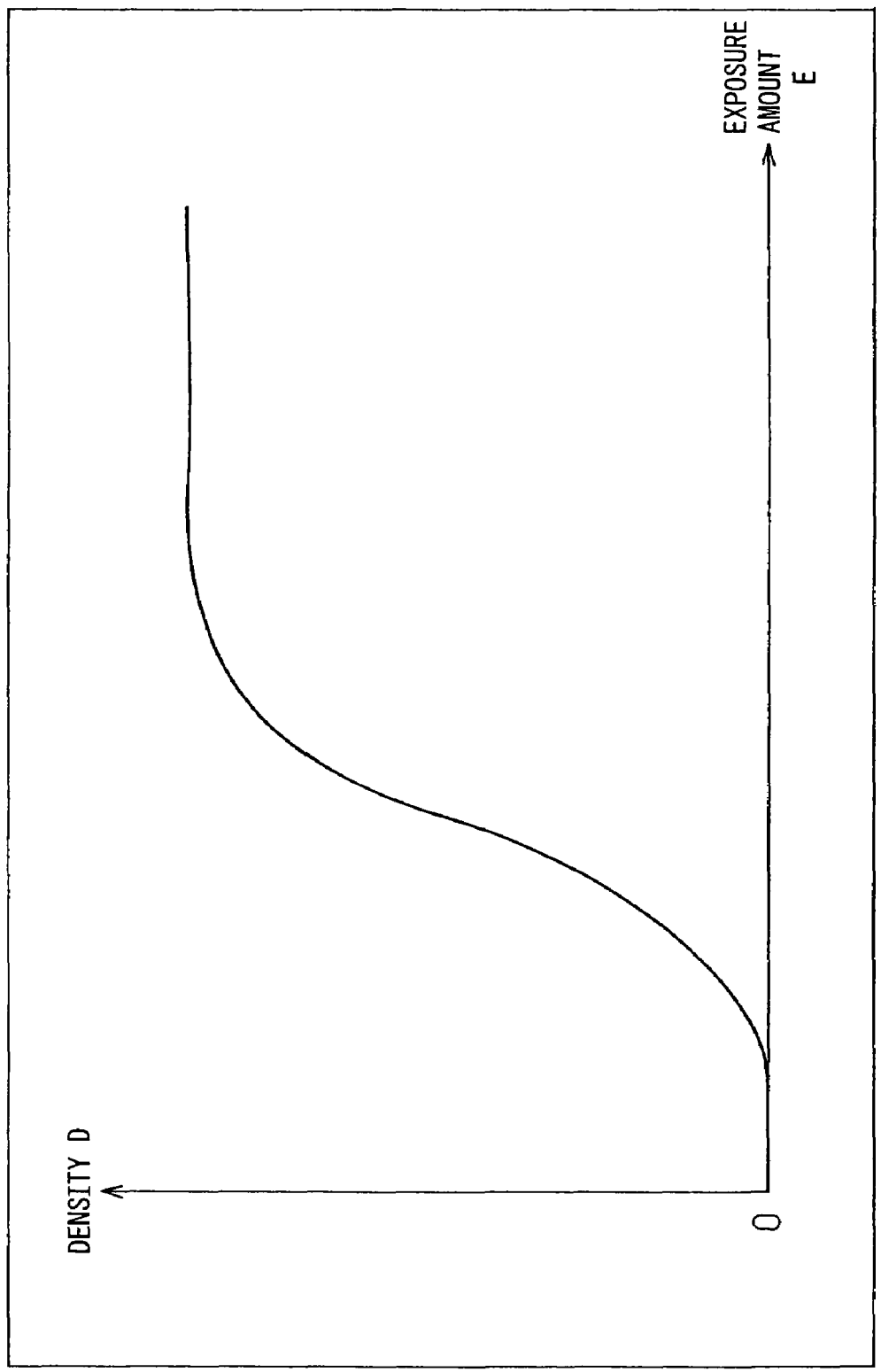
FIG. 19 is a diagram showing one example of the sensitivity characteristic of a photosensitive material.

On the other hand, the sensitivity characteristic of the photosensitive material, shown in FIG. 19, represents the relationship between the density D and exposure amount E on the photosensitive material, where the density D corresponds to the grayscale level and the exposure amount E corresponds to the exposure illumination amount.

In the present embodiment, a unique relational equation T(H) defining the relationship between the grayscale level data H and the normalized exposure illumination amount T is obtained from the graphs shown in FIGS. 18 and 19; to facilitate the calculation in the subsequent step, the relational equation is expressed by the following 10th degree polynomial by using a least squares approximation method.

[MATHEMATICAL 1]

$$T(H) = \sum_{i=0}^{10} A_i H^i = A_0 + A_1 \cdot H + A_2 \cdot H^2 + A_3 \cdot H^3 + A_4 \cdot H^4 +$$
$$A_5 \cdot H^5 + A_6 \cdot H^6 + A_7 \cdot H^7 + A_8 \cdot H^8 + A_9 + H^9 + A_{10} \cdot H^{10}$$

Here, the coefficients $A_0$ to $A_{10}$ in the equation have the values shown in Table 1 below for the respective color LEDs.

TABLE 1

| Coefficient | Red | Green | Blue |
| --- | --- | --- | --- |
| $A_0 =$ | 1.70162E−05 | −1.77629E−05 | −2.22264E−05 |
| $A_1 =$ | 0.000121884 | 0.003690198 | 0.002519878 |
| $A_2 =$ | 3.02639E−05 | −0.000354631 | −0.000219781 |
| $A_3 =$ | −2.40994E−06 | 1.55701E−05 | 1.10647E−05 |
| $A_4 =$ | 1.07437E−07 | −3.26235E−07 | −2.74451E−07 |
| $A_5 =$ | −2.13617E−09 | 3.95078E−09 | 3.89363E−09 |
| $A_6 =$ | 2.28938E−11 | −2.94641E−11 | −3.36148E−11 |
| $A_7 =$ | −1.42627E−13 | 1.37082E−13 | 1.79632E−13 |
| $A_8 =$ | 5.18871E−16 | −3.86408E−16 | −5.79815E−16 |
| $A_9 =$ | −1.02478E−18 | 6.00614E−19 | 1.03472E−18 |
| $A_{10} =$ | 8.50283E−22 | −3.91608E−22 | −7.82463E−22 |

In the present embodiment, T(H) has been obtained using the 10th degree polynomial as described above, but the relational equation is not limited to the 10th degree polynomial. However, since the characteristics shown in FIGS. 18 and 19 are nonlinear, it is preferable to approximate the relation by using a relational equation of degree 3 or higher.

Figure 21:
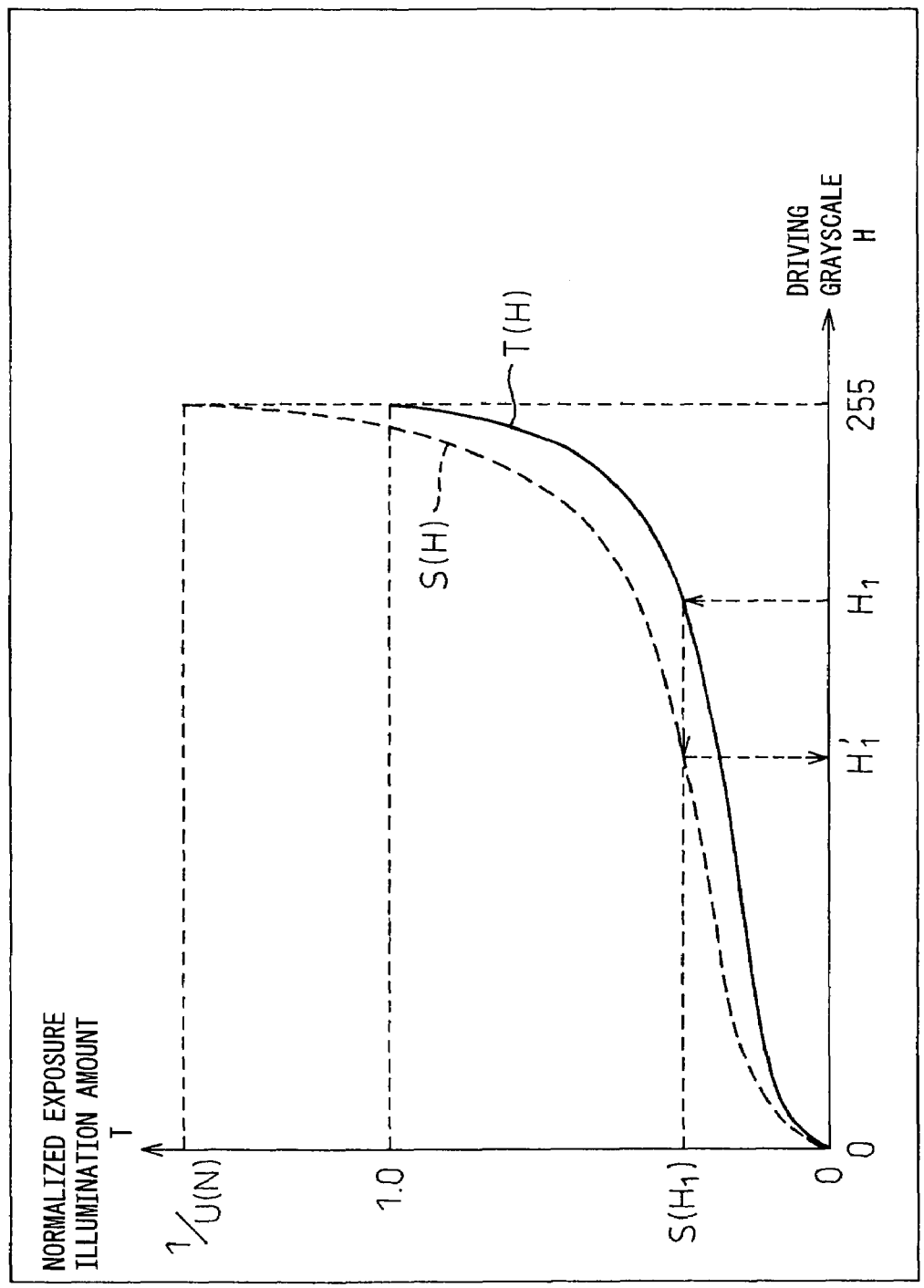
FIG. 21 is a diagram showing one example of a relational equation.

FIG. 21 shows examples of T(H), S(H), etc. described above. As shown in FIG. 21, since U(N)=1.00 for the driving pixel corresponding to Fmin, it follows that S(H)=T(H), and the normalized driving time corresponding to the highest grayscale level 255 is 1.00, which is the maximum exposure illumination amount. For a driving pixel whose amount of light is higher than Fmin, when the same grayscale level $H_1$ is given, the exposure amount required is $S(H_1)$, and the driving grayscale for obtaining the same exposure amount is therefore $H_1'$. That is, when the driving grayscale $H_1$ is given to the applicable driving pixel, the shading correction is applied so as to correct the grayscale to $H_1'$.

Correction values obtained in this manner are shown by way of example in FIG. 22. In FIG. 22, corrected driving grayscales corresponding to all the driving grayscale levels given are shown for each driving pixel N. In the example of FIG. 22, the 123rd pixel is shown as the driving pixel corresponding to Fmin. The example of FIG. 22 shows the correction values for only the red LED device, but in actuality, correction values are also obtained in accordance with a similar procedure for the blue and green LED devices, and stored in the correction value storing memory.

As earlier described, the correction values (see FIG. 22) obtained in accordance with the flow of FIG. 16 are stored in the designated memories, such as the correction value storing memory 153 and the LED driving condition storing memory 163, provided in the exposure control circuit 150 connected to the exposure head 100. Here, the correction values may be written to a recording medium such as an FD or CD together with the electric current values obtained in the flow of FIG. 12 for the respective color LEDs, and the recording medium may be shipped with the exposure head 100 thus measured.

Figure 23:
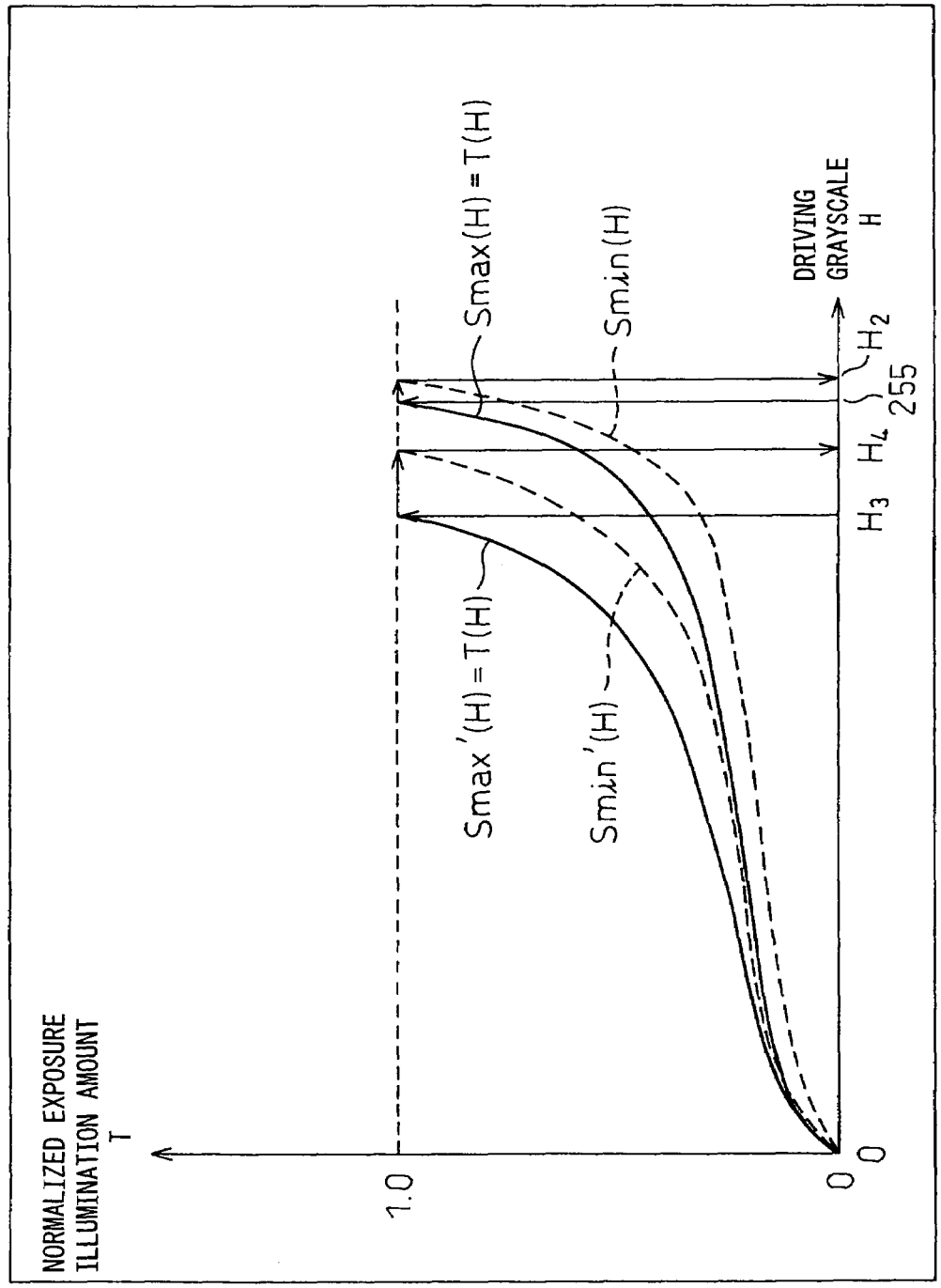
FIG. 23 is a diagram for explaining an advantage in obtaining the correction values by reference to Fmin.

Next, the reason for obtaining the correction values by reference to the minimum light amount Fmin will be described briefly with reference to FIG. 23. Fmin is chosen as the reference in order to effectively utilize the full range of the driving grayscale. For example, when Fmin is set as the reference, the driving pixel having the lowest exposure illumination amount is the driving pixel corresponding to Fmin; if the highest grayscale level 255 is given to that driving pixel, the correction value is also 255. However, if the correction reference value were to be obtained for each driving pixel by reference to the maximum light amount Fmax, the reference correction value U(N)=1.00 would have to be mapped to the maximum light amount Fmax, and hence Smax(H)=T(H) for the driving pixel corresponding to Fmax. Here, if the driving pixel corresponding to Fmax were set so as to provide the maximum normalized exposure illumination amount (1.00) at the highest grayscale level 255 (see Smax(H)), then when the highest driving grayscale (255) was given to the driving pixel corresponding to Fmin, a correction would have to be made so that an amount of light higher than Fmax would be obtained. In that case, as shown in FIG. 23, to obtain the maximum normalized exposure illumination amount required, a correction would have to be made so as to provide a driving grayscale $H_2$ which is higher than the highest grayscale level 255 (see Smin(H)). However, correcting the driving grayscale to the level higher than the highest grayscale level 255 is not possible.

One way to circumvent this would be to predefine the relational equation with some margin so that the driving pixel corresponding to Fmax would provide the maximum normalized exposure illumination amount at a driving grayscale level $H_3$ lower than the highest grayscale level 255 (see Smax'(H)). However, differences in the amount of light, occurring in a random manner among the driving pixels, cannot be predicted accurately. Here, if the corrected relational equation for the driving pixel corresponding to the minimum light amount Fmin were set as Smin'(H), for example, as shown in FIG. 23, then when the driving grayscale level $H_3$ was given to that driving pixel, the grayscale level would only be corrected to $H_4$. Therefore, the full range up to the highest grayscale level 255 could not be made use of (see Smin'(H)).

By contrast, in the case of correcting the correction value by reference to the minimum light amount Fmin, as the driving pixel corresponding to the minimum light amount Fmin can be set to provide the maximum normalized exposure illumination amount at the highest grayscale level, it becomes possible to make effective use of the full range of the driving grayscale.

Figure 24:
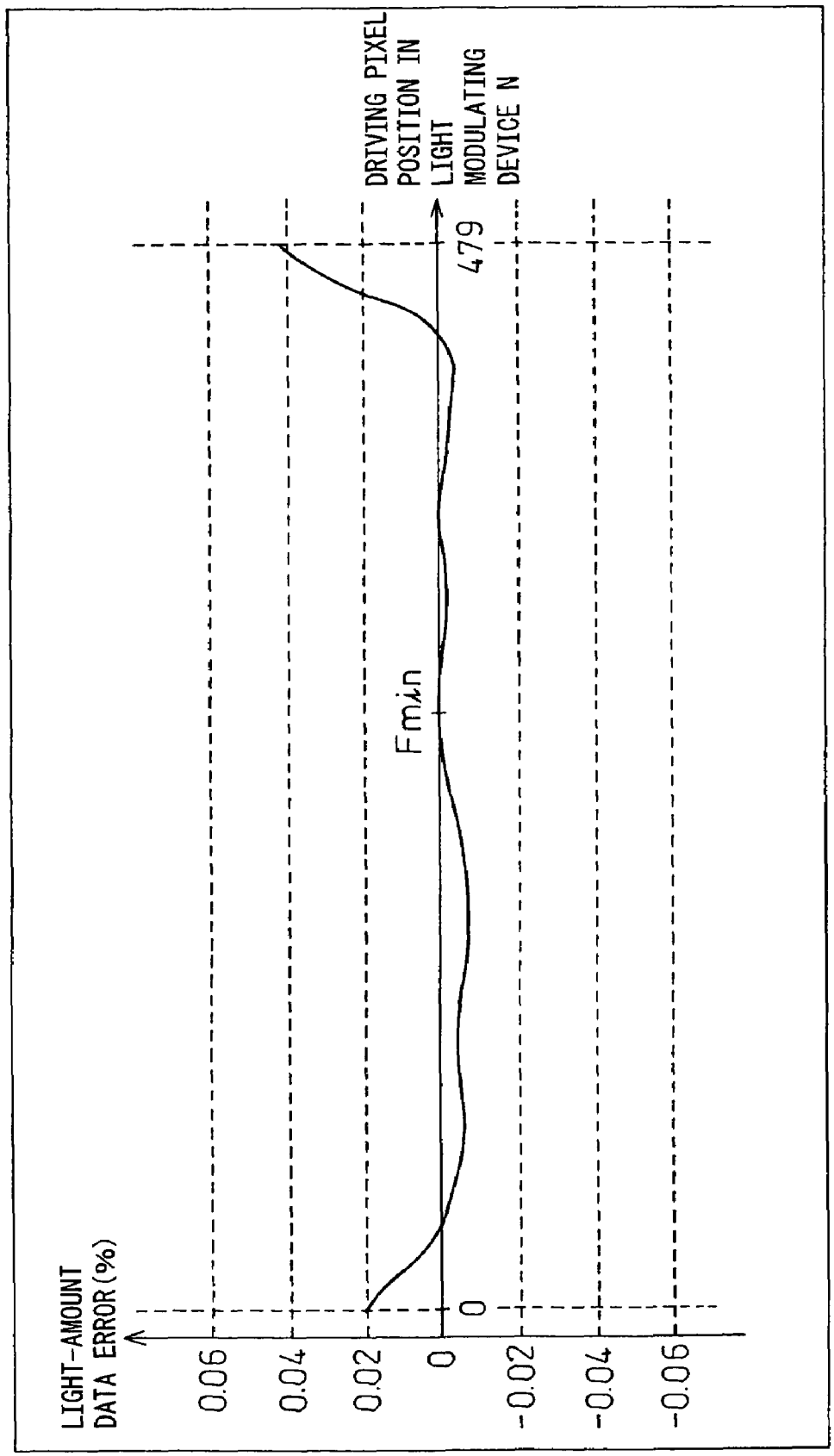
FIG. 24 is a diagram showing one example of the result of the shading correction performed using the correction values obtained in accordance with the flow of FIG. 16.

FIG. 24 shows one example of the result of the shading correction that has been performed using the correction values obtained in accordance with the flow of FIG. 16. FIG. 24 shows the distribution of the amount of light with the amount of light of each driving pixel expressed in terms of an error (%) relative to the minimum light amount Fmin.

In the illustrated example, the red LED in the exposure head 100 was turned on by applying the LED current obtained in accordance with the flow of FIG. 12, and the highest grayscale level data (255) was given to all the driving pixels; then, driving correction control was performed using the correction values shown in FIG. 22, and the amounts of light were measured again in accordance with the flow of FIG. 12. As shown, the error among the amounts of light of the 480 driving pixels was 0.04% at maximum, which means that the error was corrected to the level that does not affect the image formation at all.

Here, the relationship between the contents of the flowchart shown in FIG. 12 and the embodiments described hereinafter will be summarized. Steps 1206 and 1207 correspond to a peak detection process (A) in which the peak value (maximum value) and the valley (minimum value) occurring in correspondence with particular pixels and the positions of their occurrences (the numbers of the light-receiving elements) are detected based on the light-amount data E(X), in order to determine the correspondences between the pixels and the light-receiving elements. The peak detection process (A) is carried out by one of two methods, the method explained in the description of the first embodiment or the method that will be explained in the third embodiment to be described later; for example, when the driving pixels have a tilted shape as will be described later, the peak value can be detected easily by employing the method explained in the third embodiment.

Steps 1208 to 1211 correspond to an effective pixel region determining process (B) in which, out of the driving pixels arranged in a line, the pixel region effective in determining the correction values is determined based on the peak values and valleys detected in the peak detection process.

Step 1212 corresponds to an illuminance determining process (C) for determining the illuminance of each driving pixel contained in the effective pixel region. The illuminance determining process (C) is carried out by one of two methods, the method that takes the peak value P(N) as representing the illuminance (F(N)) of the driving pixel as explained in the description of the first embodiment or the method that will be explained in the second embodiment hereinafter described; in particular, if the method explained in the second embodiment is employed, the illuminance (F'(N)) of each driving pixel can be obtained with higher accuracy.

Next, the second embodiment will be described.

In the second embodiment, correction values for shading correction are obtained by using the illuminance F'(N) of each driving pixel that has been determined using a method different from the method used to determine the illuminance F(N) in the flow of FIG. 12. The flow after F'(N) has been obtained by the method hereinafter described is the same as the corresponding flow shown in FIG. 16, except that F(N) is replaced by F'(N).

In the process hereinafter described, the peak position Xp that yields the peak value P(N) between the valleys V(N) in the detected light-amount data E(X) is taken as the representative position of each driving pixel and, using a weight function W(X), F'(N) is obtained and used as the illuminance for the shading correction.

As previously described, in the flow of FIG. 16, P(N) has been taken as representing the illuminance F(N) of each driving pixel. This means that, as a plurality of light-receiving elements correspond to one driving pixel, the measured value of the light-receiving element exhibiting the peak value is regarded as representing the amount of light of the driving pixel. In reality, however, light rays from a plurality of driving pixels are incident in overlapping fashion on the plurality of light-receiving elements, and the peak value may not always coincide with the amount light of the particular one driving pixel. In view of this, in the present embodiment, the illuminance F'(N) of the one particular driving pixel is determined, by using the weight function W(x), from the detected light-amount data E(X) obtained from the light-receiving elements (X is 0 to 2047). That is, as the detected light-amount data E(X) represents a mixture of light rays incident from a plurality of driving pixels, the illuminance of the one particular driving pixel is estimated using the weight function W(X). Once the illuminance F'(N) of each driving pixel is estimated, optimum shading correction can be performed by properly controlling each driving pixel.

Figure 28:
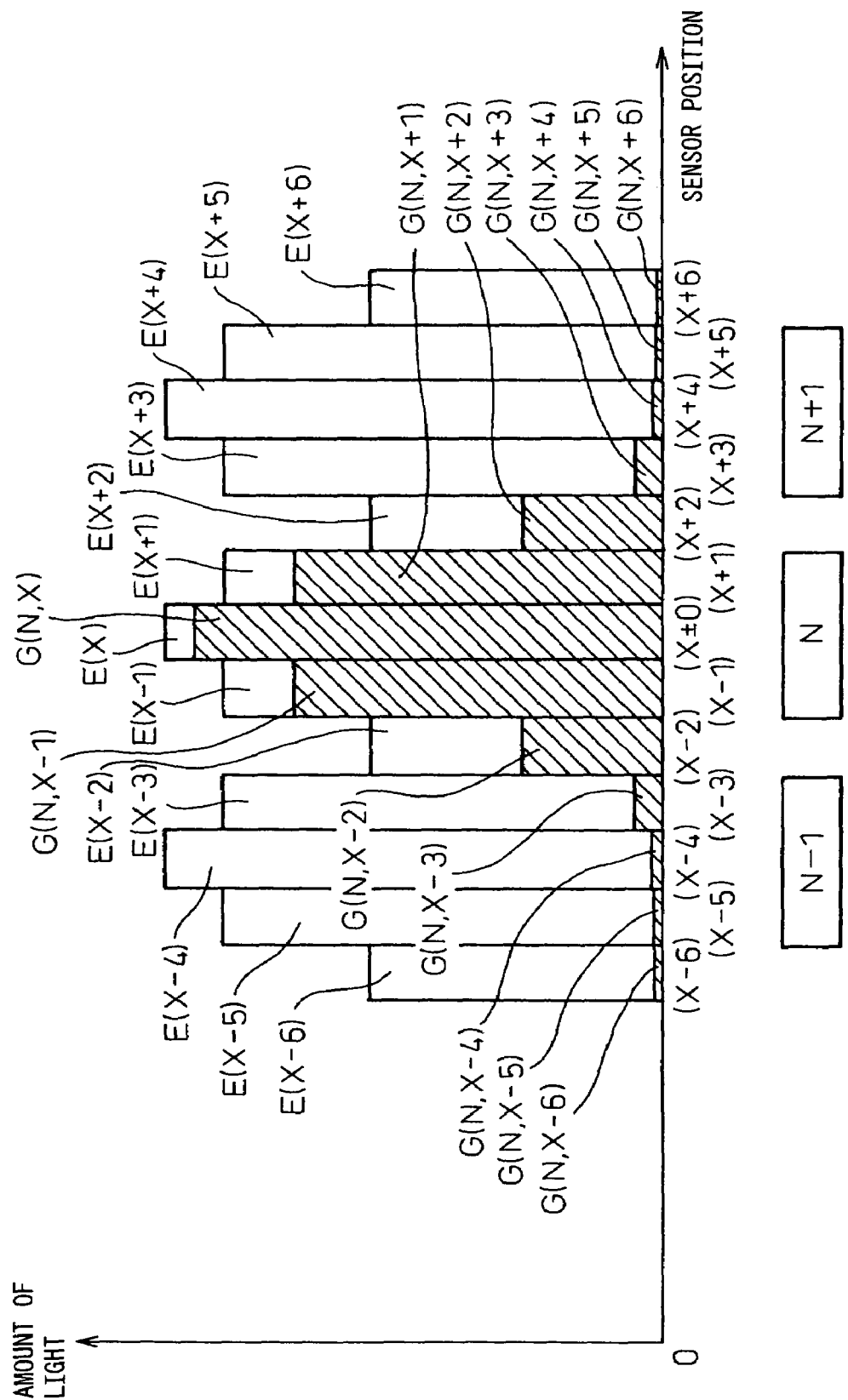
FIG. 28 is a diagram showing the relationship between an ideal light-amount distribution and a continuous light-amount distribution.

Next, referring to FIG. 28, a description will be given of how the weight function W(X) is obtained. In FIG. 28, (N−1), (N), and (N+1) indicate three driving pixels in the liquid crystal shutter array 118, E(X−6) to E(X+6) indicate the (combined) light-amount data of the 13 light-receiving elements in the CCD sensor array 230 that correspond to the three driving pixels, and (X−6) to (X+6) indicate the positions of the respective light-receiving elements. In FIG. 28, it is assumed that the driving pixels (N−1) to (N+1) are ideal ones with no variations in the light-amount distribution. The light-amount data E(X−6) to E(X+6) are shown by unfilled bars in the bar graph. In the illustrated example, the peak value P(N) corresponding to the pixel N−1 corresponds to the light-receiving element X−4; likewise, the light-receiving element X±0 corresponds to the driving pixel N, and the light-receiving element X+4 to the driving pixel N+1.

As the driving pixels N−1, N, and N+1 are arranged close to each other, the amount of light received by the light-receiving element X±0 when all the driving pixels are open is detected as the (combined) light amount E(X), combining the light amount from the driving pixel N−1, the light amount from the driving pixel N, and the light amount from the driving pixel N+1.

Here, attention was paid to one particular driving pixel N, and only the driving pixel N was opened and the other driving pixels closed, thus allowing light to pass through only the driving pixel N while preventing light from passing through the other driving pixels; in this condition, the light amounts G(N, X−6) through G(N, X±0) to G(N, X+6) detected by the respective light-receiving elements (X) were obtained and plotted using obliquely hatched bars in the bar graph.

Then, the ratios of the light amounts G(N, X−6) to G(N, X+6) to the light amounts E(X−6) to E(X+6) corresponding to the respective light-receiving elements (X−6 to X+6) were calculated, and each ratio was taken as the weight function W(X). Specific numeric values are shown in Table 2.

Using this weight function, the amount of the light incident only from one particular driving pixel disposed directly above each light-receiving element can be accurately obtained from the combined light amount detected as the sum of the amount of the light incident from the driving pixel disposed directly above the light-receiving element and the amount of the light incident from the driving pixels adjacent to that driving pixel.

TABLE 2

| Position of element | W(X) (ratio) |
|---|---|
| X − 6 | 0.009 |
| X − 5 | 0.011 |
| X − 4 | 0.018 |
| X − 3 | 0.071 |
| X − 2 | 0.487 |
| X − 1 | 0.906 |
| X ± 0 | 0.954 |
| X + 1 | 0.906 |
| X + 2 | 0.487 |
| X + 3 | 0.072 |
| X + 4 | 0.018 |
| X + 5 | 0.011 |
| X + 6 | 0.009 |

Figure 25:
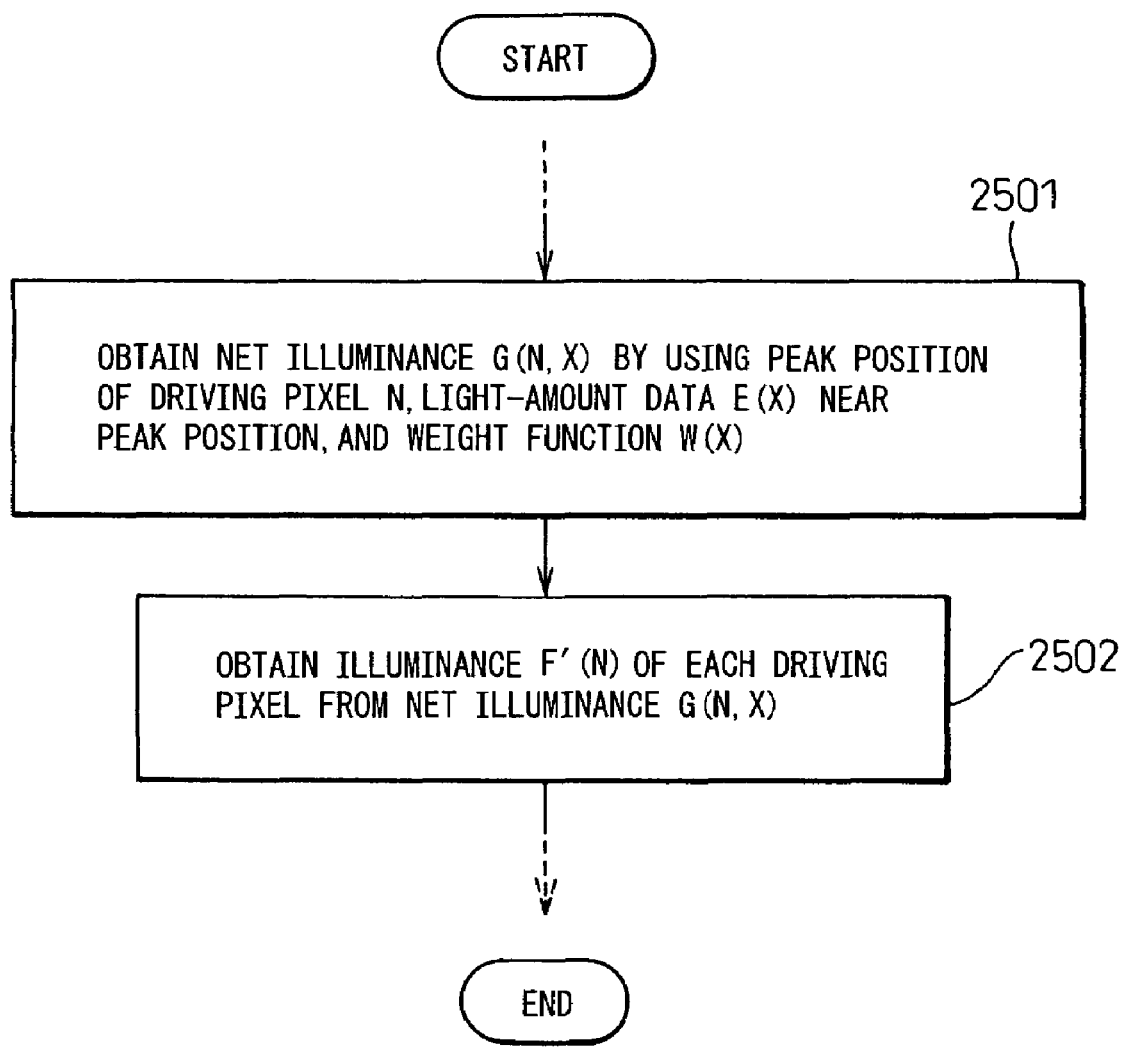
FIG. 25 is a diagram showing a second processing flow for obtaining illuminance.

FIG. 25 shows a flow for obtaining the illuminance F'(N) of each driving pixel (N is 5 to 474). The flow of FIG. 25 is one that replaces the step 1212 in the flow of FIG. 12; the other steps are exactly the same as those shown in FIG. 12.

After step 1213 in FIG. 12, the net illuminance G(N, X) of the driving pixel N corresponding to the peak value P(N) is obtained by using the weight function W(X) and the detected light-amount data E(X) near the position X of the light-receiving element from which the peak value P(N) was detected (step 2501).

Next, the net illuminance G(N, X) is integrated to obtain the illuminance F'(N) of the driving pixel N (step 2502).

Thereafter, the process returns to FIG. 12 and proceeds to step 1213, and the finally obtained illuminance F'(N) is stored in the light-amount storing memory 215 (step 1218). After that, the process proceeds to the flow of FIG. 16 where the shading correction value is obtained based on the illuminance F'(N).

In the second embodiment, after obtaining the light-amount data E(X) again in step 1216, the process may proceed directly to step 1212 without returning to step 1206, as shown by the dashed line 1219 in FIG. 12.

This is because, even if the LED current value is changed in step 1215, the peak position X does not change. Accordingly, as shown by the dashed line 1219, the previously detected peak position is used as-is in the peak detection process (A) and the effective pixel region determining process (B).

Figure 26:
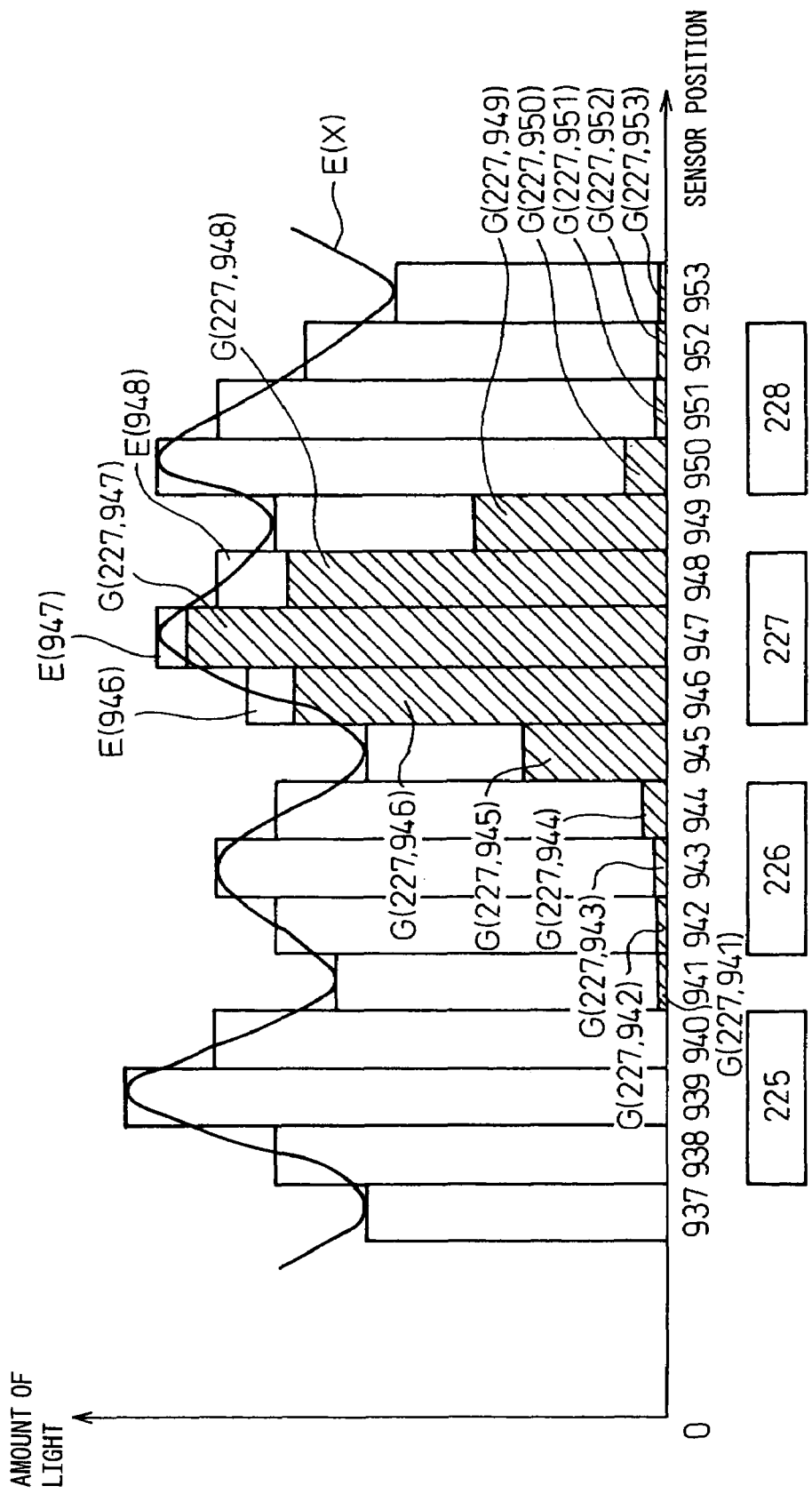
FIG. 26 is a diagram showing the relationships between weight functions, distribution of sole illuminance, and illuminance.

FIG. 26 shows the relationships of the positions of the light-receiving elements (937 to 953), the (combined) light-amount data E(X) detected by the respective light-receiving elements, and the net illuminance G(X, N) hereinafter described.

The (combined) light-amount data E(937) to E(953) are shown by unfilled bars in the bar graph (some of the designations are omitted). In the illustrated example, the peak value P(225) corresponding to the driving pixel 225 corresponds to the light-receiving element 939; likewise, the light-receiving element 943 corresponds to the driving pixel 226, the light-receiving element 947 to the driving pixel 227, and the light-receiving element 950 to the driving pixel 228.

Here, attention was paid to one particular driving pixel 227, and the net illuminances G(227, 941) to G(227, 953) incident on the respective light-receiving elements (941 to 953) through this particular driving pixel 227 were obtained and plotted using obliquely hatched bars in the bar graph.

The method of obtaining the net illuminances G is as follows: the light amount E(947) of the light-receiving element (947) corresponding to the peak value P(227) of the driving pixel 227 and the light amounts E(941) to E(946) and E(948) to E(953) of the light-receiving elements (a total of six light-receiving elements on both sides of 947) adjacent to the left and right of the light-receiving element (947) are respectively multiplied by their corresponding weight functions W(X−6) to W(X+6), to extract only the net illuminances G(227, 941) to G(227, 953) presumed to be incident on the respective light-receiving elements (941 to 953) through the driving pixel 227. In the present embodiment, almost all the light emerging from the driving pixel 227 has successfully been extracted by calculating it based on the light amounts obtained from the light-receiving elements (945 to 949) located substantially directly above the driving pixel 227 and on the light amounts obtained from the light-receiving elements (941 to 944) and (950 to 953) located substantially directly above the respective driving pixels 226 and 228 on both sides of the driving pixel 227. The illuminance F'(227) shown in FIG. 27 is obtained by integrating the net illuminances G(227, 941) to G(227, 953).

The step 1212 "OBTAIN ILLUMINANCE F(N) OF EACH DRIVING PIXEL" in FIG. 12 is accomplished by the above method.

In the present embodiment, the light-receiving elements 941 to 953 have been chosen as the extraction targets to extract the illuminance corresponding to the driving pixel 227, but the range over which to choose the extraction targets can be determined appropriately by considering the distances between the respective driving pixels, etc.

Figure 27:
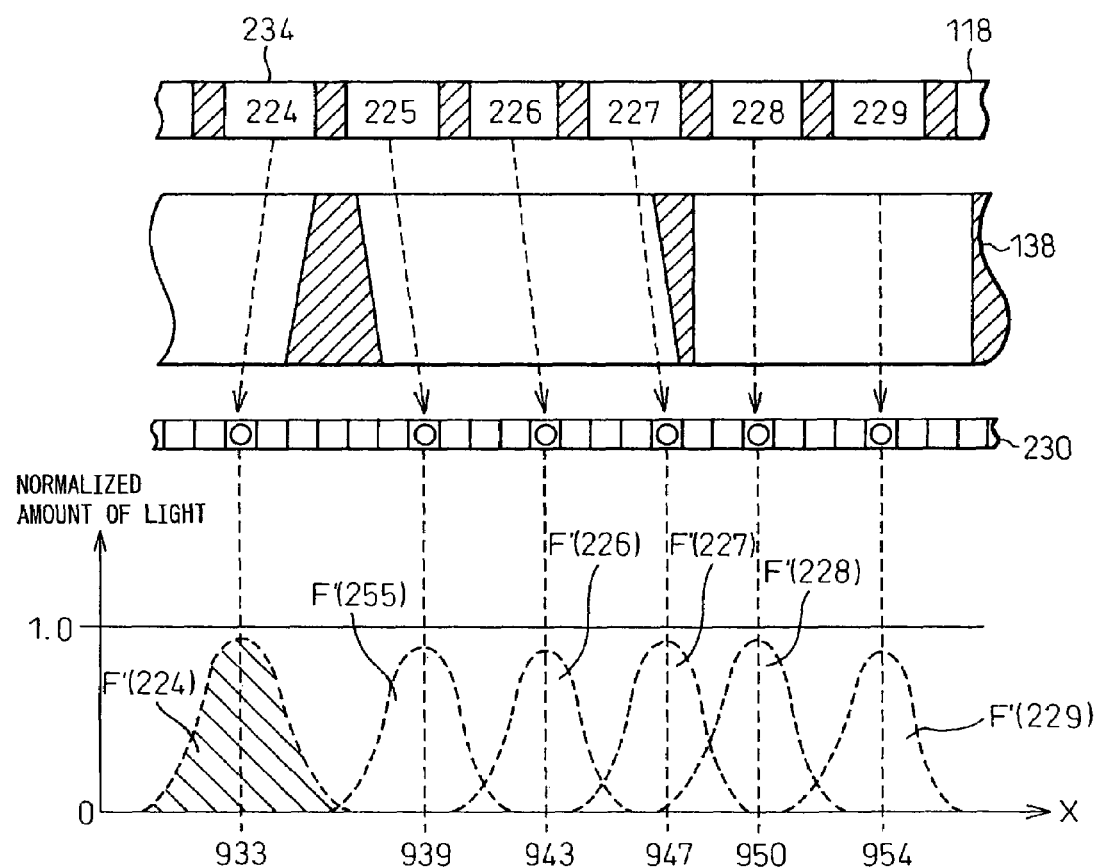
FIG. 27 is a diagram for explaining the relationships between the driving pixels, light-receiving elements, and the illuminance of each driving pixel.

FIG. 27 shows the relationship between the illuminance F'(N) corresponding to each driving pixel and the peak position. In the figure, illuminances F'(224) to F'(229) corresponding to the 224th to 229th driving pixels are shown. FIG. 27 also shows how the light from each driving pixel 234 of the liquid crystal shutter array 118 reaches the CCD sensor array 230 by passing through the SELFOC lens array 138. Due to the tilting, etc. of the microlenses forming the selfoc lens array, the light from each driving pixel of the liquid crystal shutter array 118 may not propagate in a straight line but propagate obliquely. Accordingly, the peak positions (each shown by an unfilled circle in the figure) at which the peak light amounts P(N) are detected by the CCD sensor array 230 may not always be at equally spaced intervals.

As described above, in the second embodiment, the net illuminance G(N, X) is obtained from the peak position of each driving pixel N, the light-amount data E(X) near the peak position, and the weight function W(X), and the illuminance F'(N) of each driving pixel N is obtained from the net illuminance G(N, X). Since almost all the amount of the light emerging from one particular driving pixel N can be extracted using the net illuminance G(N, X), correct shading correction can be performed by correcting the illuminance F'(N). Accordingly, even if there are variations in the peak positions in the light-amount distribution among the driving pixels of the liquid crystal shutter array 118, the correction value for the shading correction can be accurately obtained for each driving pixel.

Next, the third embodiment will be described.

In the third embodiment, the liquid crystal shutter array 118' having the tilted driving pixels 234' previously shown in FIG. 9B is used, and correction values for shading correction are obtained using the peak value P'(N) and its corresponding peak position Xp' that have been determined using a method different from that used in the flow of FIG. 12. The flow after the value P'(N) and Xp' have been obtained by the method described hereinafter is the same as the flows shown in FIGS. 12 and 16, except that the value P(N) and Xp are replaced by P'(N) and Xp', respectively. Further, after obtaining P'(N) and Xp' by the following method, the correction value for the shading correction may be obtained by obtaining F'(N) in accordance with the flow shown in FIG. 25.

Figure 29:
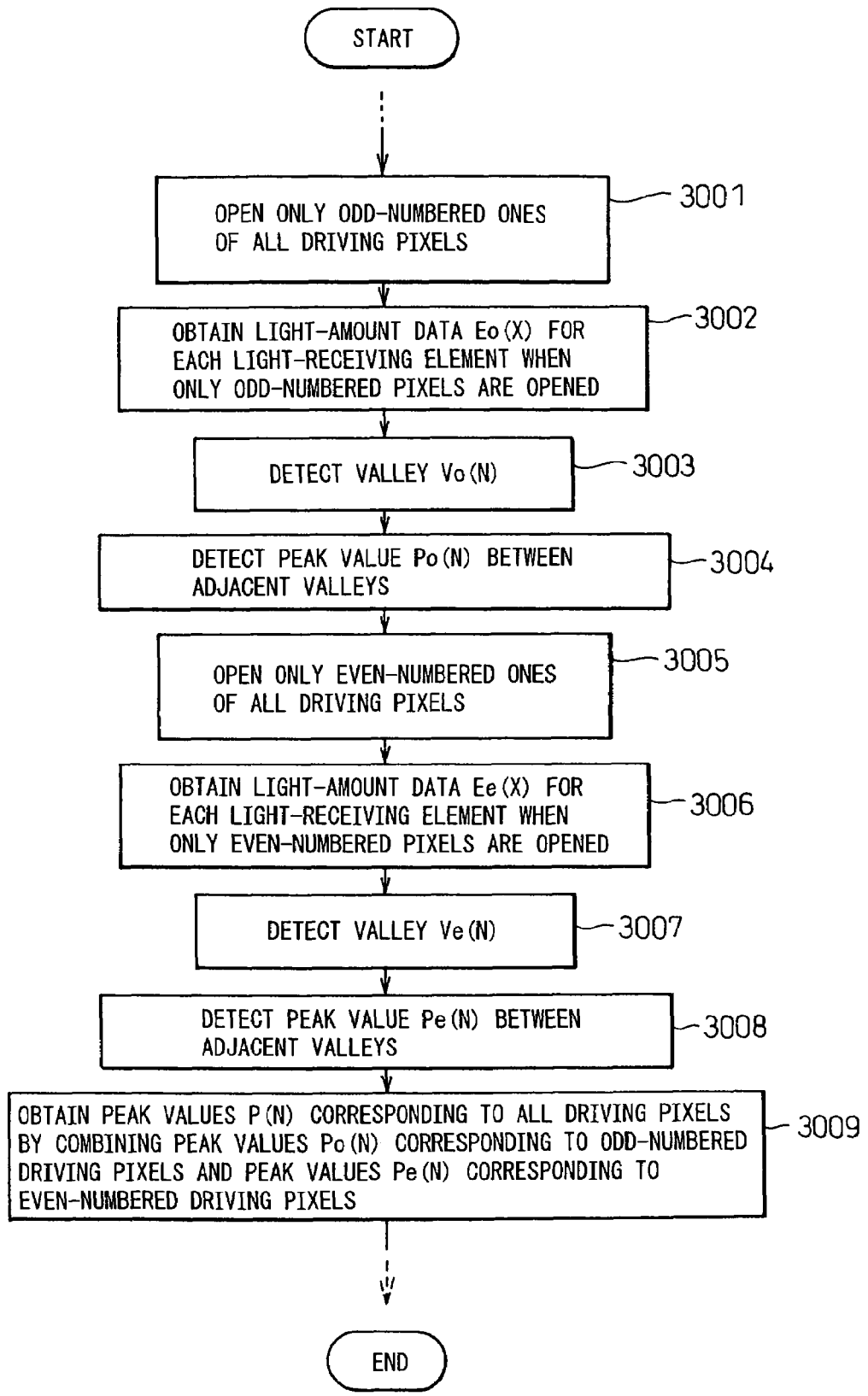
FIG. 29 is a diagram showing a second processing flow for obtaining peak values and peak positions.

FIG. 29 shows the flow for obtaining the peak value P'(N) and its corresponding peak position Xp'. The flow of FIG. 29 is one that replaces the steps 1206 and 1207 in the flow of FIG. 12; the other steps are exactly the same as those shown in FIG. 12.

Figure 30A:
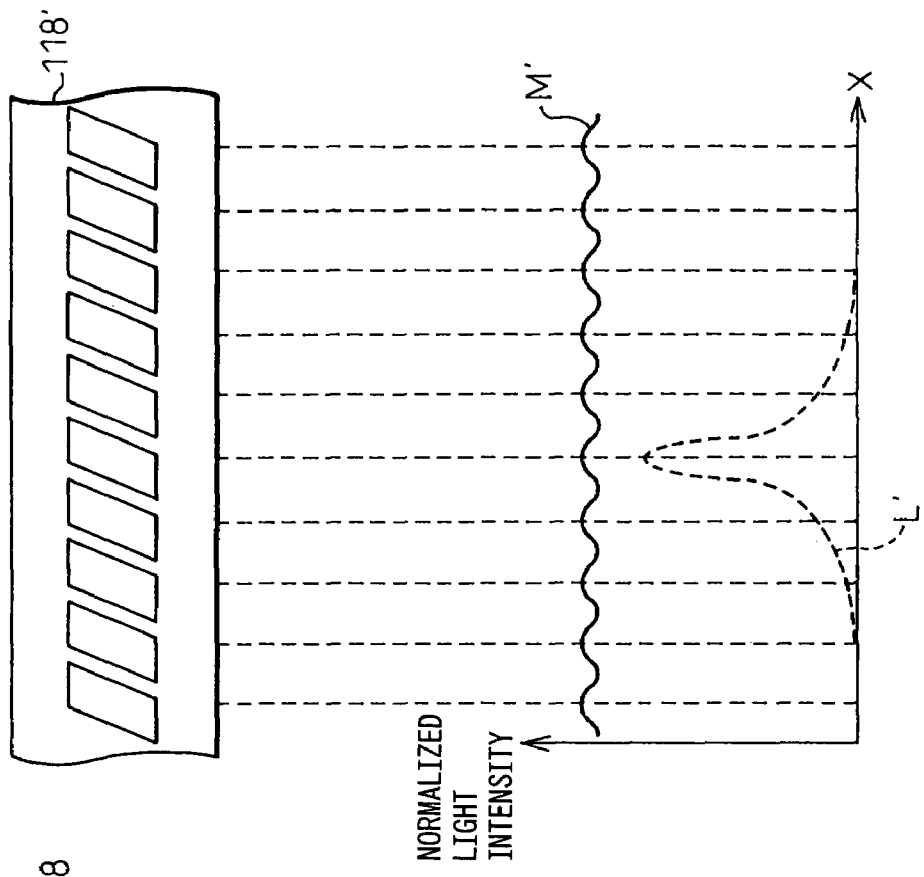
FIG. 30A is a diagram showing the distribution of sole illuminance and the continuous light-amount distribution for a liquid crystal shutter array having openings of rectangular shape.

An example of the use of the liquid crystal shutter array 118' having the tilted driving pixels 234' shown in FIG. 9B will be described. FIG. 30A shows the relationship between the ideal light-amount distribution L and the continuous illuminance distribution M when the liquid crystal shutter array 118 having the rectangular driving pixels 234 shown in FIG. 9A is used. On the other hand, FIG. 30B shows the relationship between the ideal light-amount distribution L' and the continuous illuminance distribution M' when the liquid crystal shutter array 118' having the tilted driving pixels 234' is used.

Figure 30B:
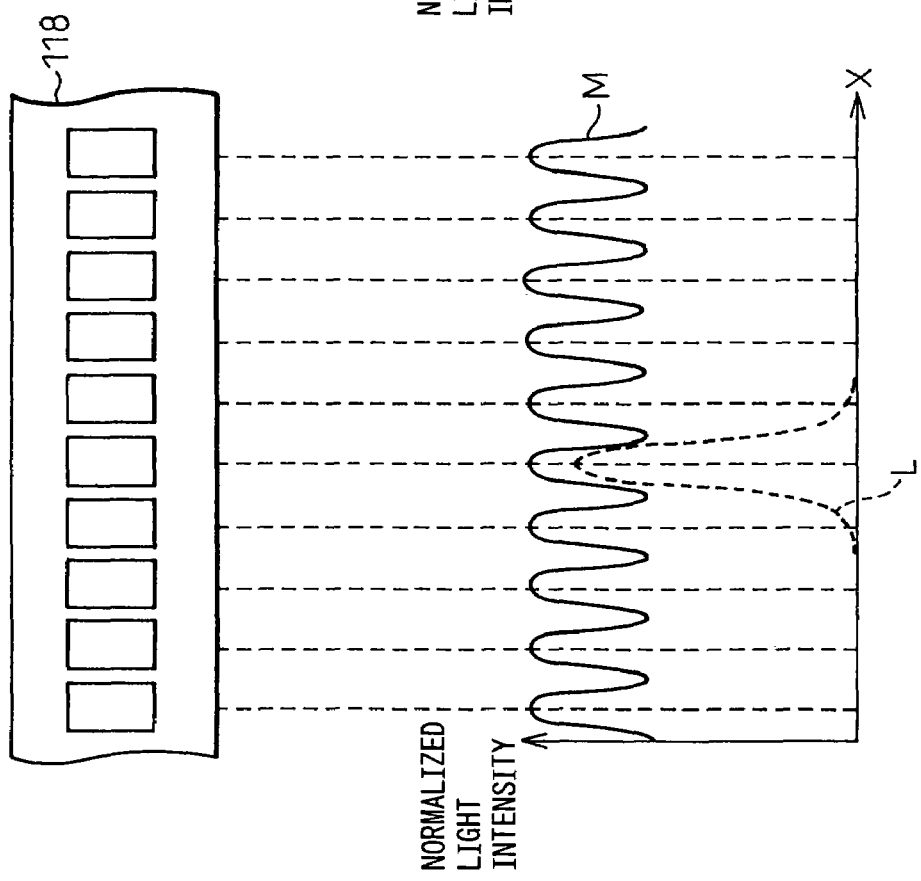
FIG. 30B is a diagram showing the distribution of sole illuminance and the continuous light-amount distribution for a liquid crystal shutter array having openings of parallelogrammic shape.

As shown in FIG. 30B, when the tilted driving pixels are used, the base of the net illuminance distribution L' spreads out, and the variation of the continuous illuminance distribution M' can be reduced (can be made flatter). Accordingly, when the tilted driving pixels are used, unexposed portions of the photosensitive material, which could arise due to gaps between the driving pixels, can be reduced, making it possible to prevent vertical stripes from being formed due to the unexposed portions remaining on the photosensitive material.

However, when the liquid crystal shutter array 118' having the tilted driving pixels 234' is used, portions where the valley-peak difference is extremely small can occur in the light-amount data detected by the CCD line sensor 230, and the valley V(N) may not be detected accurately (see step 1206 in FIG. 12). One example of such a situation is shown in FIG. 31. In FIG. 31, reference numeral 3201 shows one example of the light-amount data (corresponding to E(X) in FIG. 13) detected when the liquid crystal shutter array 118' having the tilted driving pixels 234' is used. In the center portion 3202 shown in enlarged form in FIG. 31, the valley-peak difference is so small that the valley V(N) cannot be detected accurately. This is presumably because the valley that should appear at the position indicated by 3203 has been buried in light amount variations occurring before and after it. If the valley V(N) cannot be detected accurately, the peak value P(N) and the peak position Xp at which the peak value occurs cannot be obtained accurately.

Figure 32A:
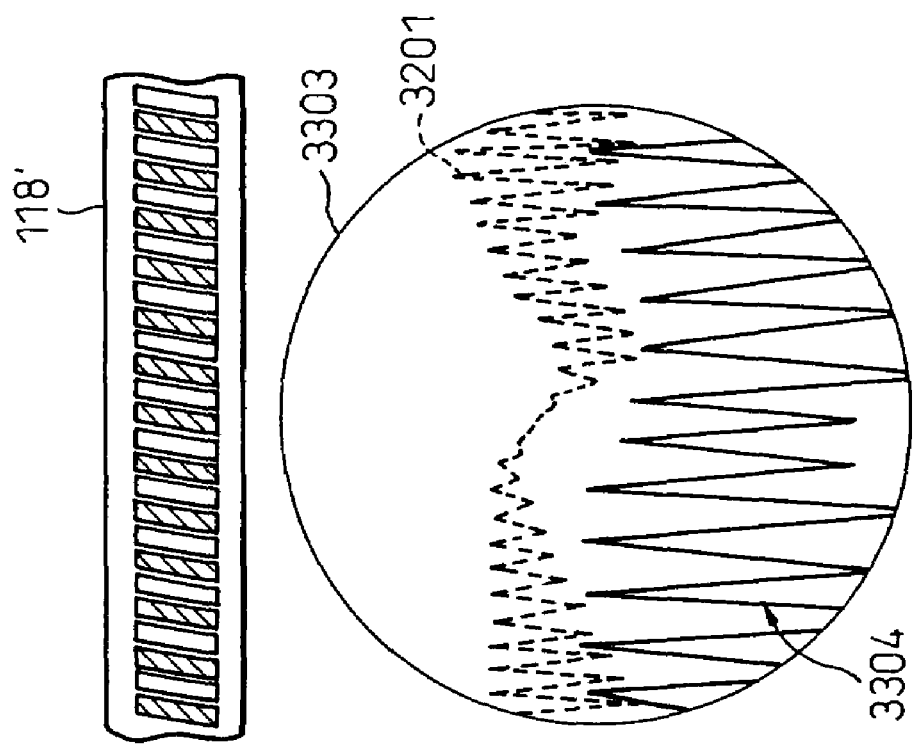
FIG. 32A is a diagram showing one example of light-amount data detected when only odd-numbered pixels are driven.
Figure 32B:
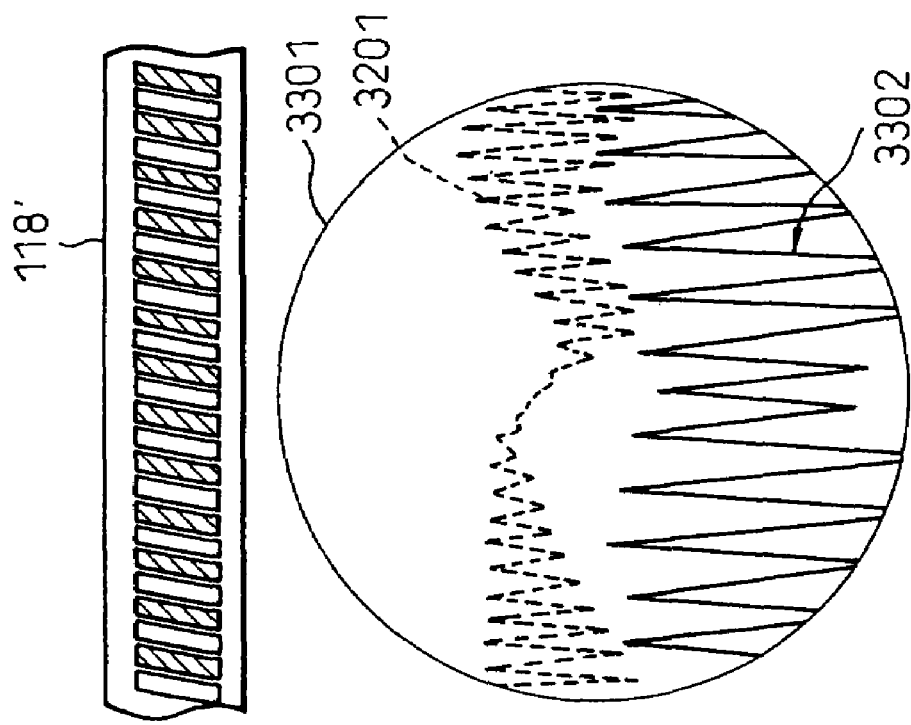
FIG. 32B is a diagram showing one example of light-amount data detected when only even-numbered pixels are driven.

In view of this, the third embodiment provides the method shown in FIG. 29 in which only the odd-numbered or even-numbered driving pixels in the liquid crystal shutter array 118' are driven in order to accurately locate the valley, the peak value, and the peak position. FIG. 32A shows the light-amount data 3302 (Eo(X)) detected when only the odd-numbered driving pixels in the liquid crystal shutter array 118' are driven. Similarly, FIG. 32B shows the light-amount data 3304 (Ee(X)) detected when only the even-numbered driving pixels in the liquid crystal shutter array 118' are driven. In the figure, the portions indicated by 3301 and 3303 each correspond to the portion 3203 in FIG. 32, and 3201 indicates the detected light-amount data depicted in FIG. 31.

As shown in FIGS. 32A and 32B, when only the odd-numbered or even-numbered driving pixels are driven, as the light amounts from both sides of each driving pixel are disregarded, the valley-peak difference increases, so that the valley V(N) can be accurately located.

The flow of FIG. 29 will be described below. This flow corresponds to the peak detection process (A) in FIG. 12.

In the present embodiment, when Emax is within the predetermined range in step 1204, in FIG. 12, the process proceeds to step 3001 in FIG. 29. The liquid crystal shutter driving circuit 212 sends an open control signal to the liquid crystal shutter array 118' so that, of all the driving pixels, only the odd-numbered driving pixels will be opened for the duration of a maximum driving time (corresponding to the highest grayscale level) (step 3001). As previously explained with reference to FIG. 12, the open control signal applied to the driving pixels need not necessarily be one corresponding to the maximum driving time, but a control signal corresponding to an intermediate driving grayscale level may be applied.

Next, the light-amount data Eo(X), detected by each light-receiving element 232 when only the odd-numbered driving pixels in the liquid crystal shutter array 118' are opened, is acquired (refer to 3302 in FIG. 32A) (step 3002).

Next, the position Vo(No) of each valley is detected from the light-amount data Eo(X) (step 3003). The method of obtaining each valley from the light-amount data is the same as that shown in step 1206 in FIG. 12.

Next, the peak value Po(No) between the adjacent valleys Vo(NO) and Vo(No+1) and the position Xpo (corresponding to the number of the corresponding light-receiving element 232) at which the peak value Po(No) is obtained are acquired (step 3004). The method of obtaining the peak value between the adjacent valleys and the peak position is the same as that shown in step 1207 in FIG. 12.

Next, the liquid crystal shutter driving circuit 212 sends an open control signal to the liquid crystal shutter array 118' so that, of all the driving pixels, only the even-numbered driving pixels will be opened for the duration of a maximum driving time (corresponding to the highest grayscale level) (step 3005).

Next, the light-amount data Ee(X), detected by each light-receiving element 232 when only the even-numbered driving pixels in the liquid crystal shutter array 118' are opened, is acquired (refer to 3304 in FIG. 32B) (step 3006).

Next, the position Ve(Ne) of each valley is detected from the light-amount data Ee(X) (step 3007). The method of obtaining each valley from the light-amount data is the same as that shown in step 1206 in FIG. 12.

Next, the peak value Pe(Ne) between the adjacent valleys Ve(Ne) and Ve(Ne+1) and the position Xpe (corresponding to the number of the corresponding light-receiving element 232) at which the peak value Pe(Ne) is obtained are acquired (step 3008). The method of obtaining the peak value between the adjacent valleys and the peak position is the same as that shown in step 1207 in FIG. 12.

Next, the peak values Po(No) corresponding to the odd-numbered driving pixels and the peak values Pe(Ne) corresponding to the even-numbered driving pixels are combined in alternating fashion, to acquire the peak values P'(N) corresponding to all the driving pixels (N is 5 to 474). Likewise, the peak positions Xpo, at which the peak values Po(No) corresponding to the odd-numbered driving pixels are respectively obtained, and the peak positions Xpe, at which the peak values Pe(Ne) corresponding to the even-numbered driving pixels are respectively obtained, are combined in alternating fashion, to acquire the peak positions Xp' at which the peak values P'(N) corresponding to all the driving pixels are respectively obtained (step 3009).

Thereafter, the process returns to FIG. 12 and proceeds to step 1208, and the illuminance F(N) finally obtained based on P'(N) and Xp' is stored in the light-amount storing memory 215 (step 1218). After that, the process proceeds to the flow of FIG. 16 where the shading correction value is obtained based on the illuminance F(N). Here, as previously described, after obtaining the peak value P'(N) and the peak position Xp' in accordance with the method of the present embodiment, the shading correction value may be obtained by obtaining the illuminance F'(N) in accordance with the method described in the second embodiment.

In the liquid crystal shutter array 118' having the tilted driving pixels shown in FIG. 9B, the driving pixels 234' are arranged in a single row, but the driving pixels may be arranged in a staggered pattern. In that case, it is preferable that the odd-numbered driving pixels be arranged along one row in the staggered pattern and the even-numbered driving pixels along the other row in the staggered pattern.

As the tilted driving pixels shown in FIG. 9B are used as described above, unexposed portions of the photosensitive material, which could arise due to gaps between the driving pixels, can be prevented, making it possible to prevent vertical stripes from being formed due to the unexposed portions remaining on the photosensitive material. Furthermore, by opening the odd-numbered driving pixels and the even-numbered driving pixels separately in accordance with the flow of FIG. 29, the peak value P'(N) and the peak position Xp' can be obtained accurately.

The invention claimed is:

1. A correction method for exposure apparatus including an exposure head having a plurality of light-emitting parts and a control means for controlling said exposure head, said method comprising the steps of:
    lighting all of odd-numbered ones of said plurality of light-emitting parts at the same time;
    lighting all of even-numbered ones of said plurality of light-emitting parts at the same time;
    detecting a first output light-amount distribution occurring when all of the odd-numbered ones of said plurality of light-emitting parts are lighted at the same time, by making measurements using a line-like light-receiving device;
    detecting a second output light-amount distribution occurring when all of the even-numbered ones of said plurality of light-emitting parts are lighted at the same time, by making measurements using a line-like light-receiving device;
    detecting a first peak position by using said first output light-amount distribution;
    detecting a second peak position by using said second output light-amount distribution;
    combining said first peak position and said second peak position so as to make a combined peak position;
    detecting the amount of light of each of said plurality of light-emitting parts based on said combined peak position; and
    determining, based on the amount of light of said each light-emitting part, a correction value for correcting non-uniformity in the amount of light of said each light-emitting part.

2. The method according to claim 1, wherein said step of determining the amount of light of said each light-emitting part includes the steps of:
    obtaining a first value corresponding to each first peak position in said first output light-amount distribution;
    obtaining a second value corresponding to each second peak position in said second output light-amount distribution: and determining the amount of light of said each light-emitting part on the basis of said first and second value.

3. The method according to claim 1,
    wherein said step of determining the amount of light of said each light-emitting part includes the steps of:
    providing a reference light-amount distribution;
    obtaining a first sole light-amount distribution for said light-emitting part corresponding to said first peak position, by using said reference light-amount distribution and said first output light-amount distribution near said peak position;
    obtaining a second sole light-amount distribution for said light-emitting part corresponding to said second peak position, by using said reference light-amount distribution and said second output light-amount distribution near said peak position; and
    determining the amount of light of said light-emitting part based on said first and second sole light-amount distribution.

4. The method according to claim 1, wherein said light-emitting parts each have an opening tilted at a prescribed angle in a direction in which said light-emitting parts are arranged.

5. The method according to claim 1, wherein said control means has a memory, and wherein
    said method further includes the step of storing said correction value for correcting non-uniformity in the amount of light of said each light-emitting part in said memory.

6. The method according to claim 1, wherein said light-receiving device includes light-receiving parts, each having a width narrower than the width of each of said light-emitting parts.

7. The method according to claim 6, wherein the number of light-receiving parts contained in said light-receiving device is equal to an integral multiple of the number of said plurality of light-emitting parts.

8. The method according to claim 7, wherein said light-receiving parts are arranged in such a manner that three or more light-receiving parts correspond to one light-emitting part.

9. The method according to claim 6, wherein a light-receiving surface formed by said plurality of light-receiving parts is longer than a light-emitting surface formed by said plurality of light-emitting parts.

* * * * *